United States Patent
Okabe et al.

[11] Patent Number: 6,031,838
[45] Date of Patent: Feb. 29, 2000

[54] ATM SWITCHING SYSTEM

[75] Inventors: Kenichi Okabe, Kawasaki; Junichi Kawaguchi, Fukuoka; Hiroko Yoshino; Masakazu Sato, both of Yokohama; Hiroshi Ishiwata, Kawasaki, all of Japan

[73] Assignee: Fujitsu Limited, Kanagawa, Japan

[21] Appl. No.: 08/905,647

[22] Filed: Aug. 4, 1997

[30] Foreign Application Priority Data

Nov. 19, 1996 [JP] Japan .................................. 8-307596

[51] Int. Cl.[7] .................................................. H04L 12/56
[52] U.S. Cl. .......................................... 370/395; 370/419
[58] Field of Search .................................. 370/389, 392, 370/393, 395, 466, 467, 535, 419

[56] References Cited

U.S. PATENT DOCUMENTS

| | | | |
|---|---|---|---|
| 4,197,427 | 4/1980 | Hutcheson et al. ..................... | 370/389 |
| 4,420,832 | 12/1983 | Salle et al. ............................. | 370/397 |
| 4,970,718 | 11/1990 | Simcoe et al. ......................... | 370/395 |
| 5,058,104 | 10/1991 | Yonehara et al. ...................... | 370/535 |
| 5,164,937 | 11/1992 | Tanabe et al. ......................... | 370/389 |
| 5,256,958 | 10/1993 | Eng et al. .............................. | 370/389 |
| 5,287,530 | 2/1994 | Davis et al. ............................ | 370/395 |
| 5,365,519 | 11/1994 | Kozaki et al. ......................... | 370/391 |
| 5,394,397 | 2/1995 | Yanagi et al. . | |
| 5,479,398 | 12/1995 | Cyr ....................................... | 370/395 |
| 5,630,065 | 5/1997 | Ishii ....................................... | 370/397 |
| 5,757,796 | 5/1998 | Hebb ..................................... | 370/393 |
| 5,774,675 | 5/1998 | Uchida .................................. | 370/397 |
| 5,838,677 | 11/1998 | Kozaki et al. ......................... | 370/389 |

*Primary Examiner*—Douglas W. Olms
*Assistant Examiner*—Kenneth Vanderpuye
*Attorney, Agent, or Firm*—Helfgott & Karas, PC.

[57] ABSTRACT

An ATM switching system concentrates cell streams, which are output by respective ones of a plurality of line interfaces, by a concentrator, enters a resulting cell stream into an ATM switch unit, deconcentrates cells, which have been switched by the ATM switch unit, by a deconcentrator on a per line interface basis and sends the cells to lines. Each line interface converts a VPI/VCI included in the header of a cell that has entered from a line to an internal cell address having a number of bits smaller than the number of bits of the VPI/VCI. Each unit in the ATM switching system performs management of various data and controls cell switching based upon a converted cell address without relying upon the VPI/VCI. The line interface restores an internal cell address, which is included in the header of a cell that enters from the side of the ATM switch, to the VPI/VCI and sends the cell to a line.

7 Claims, 22 Drawing Sheets

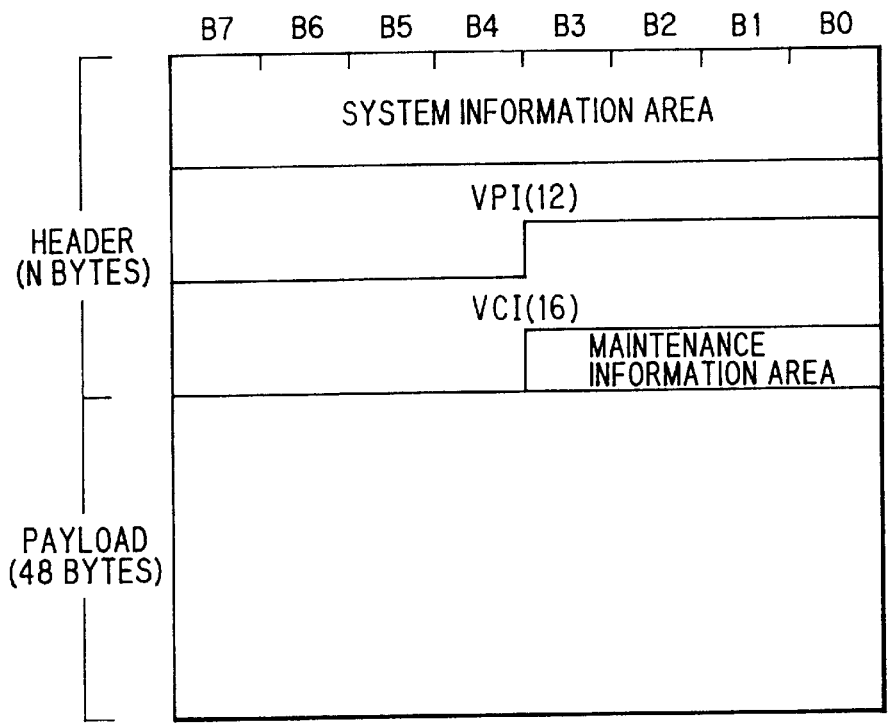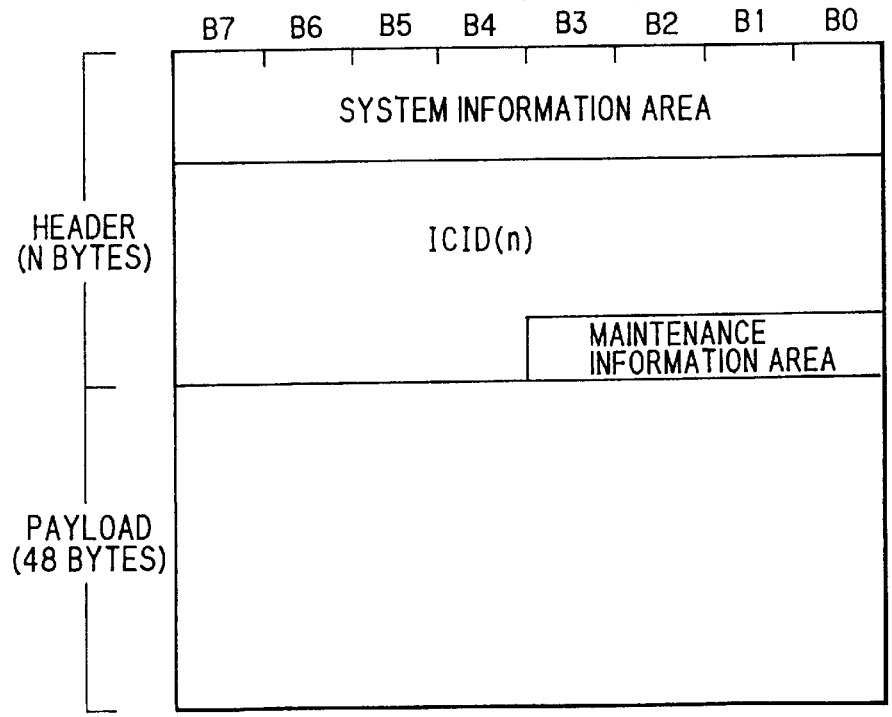

ARRANGEMENT FOR BATCH CONCENTRATION
(IN CASE OF N = 16)

ARRANGEMENT FOR DIVIDED CONCENTRATION
(IN CASE OF N = 16)

WRITE CONTROL

READ CONTROL

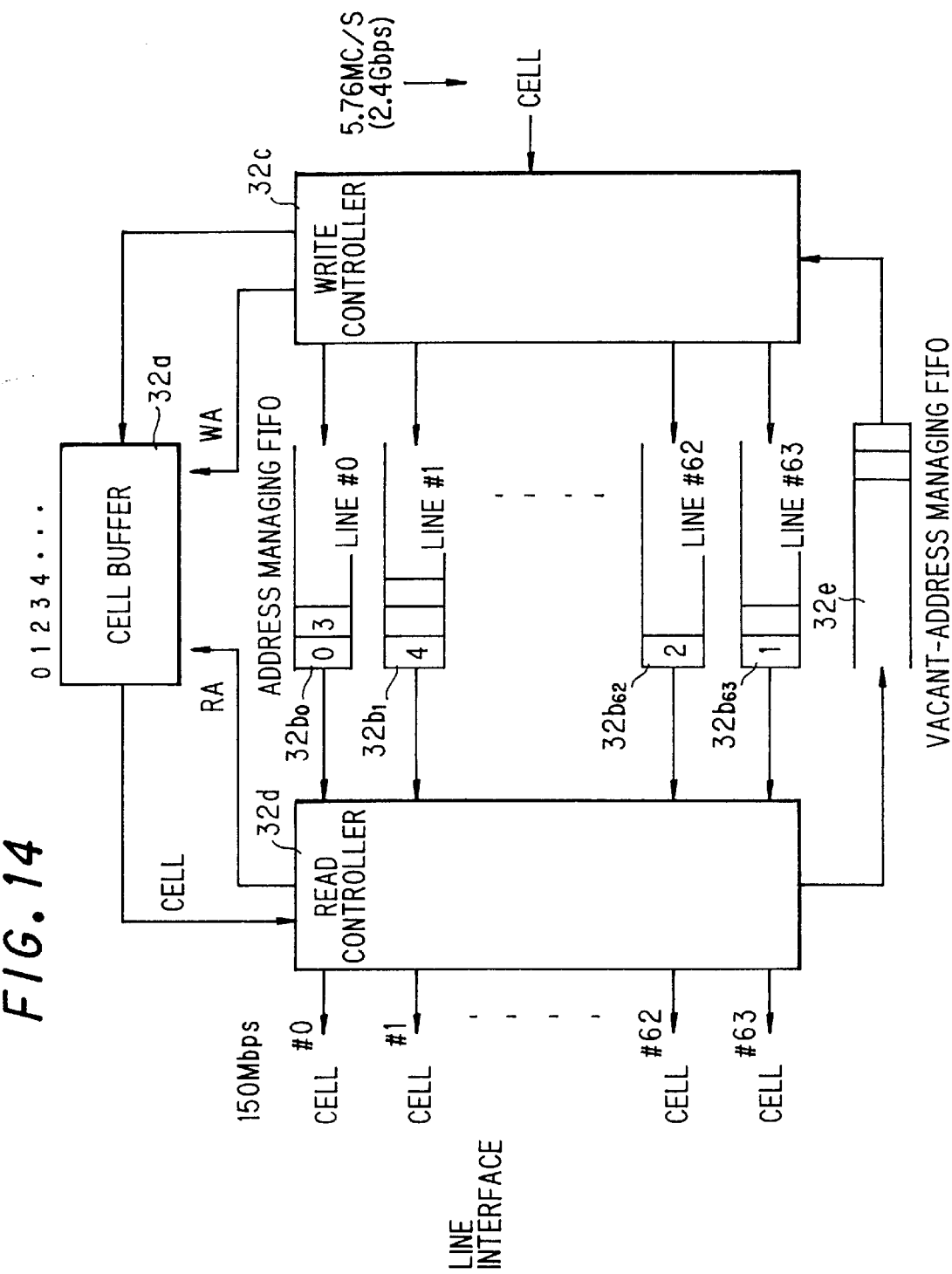

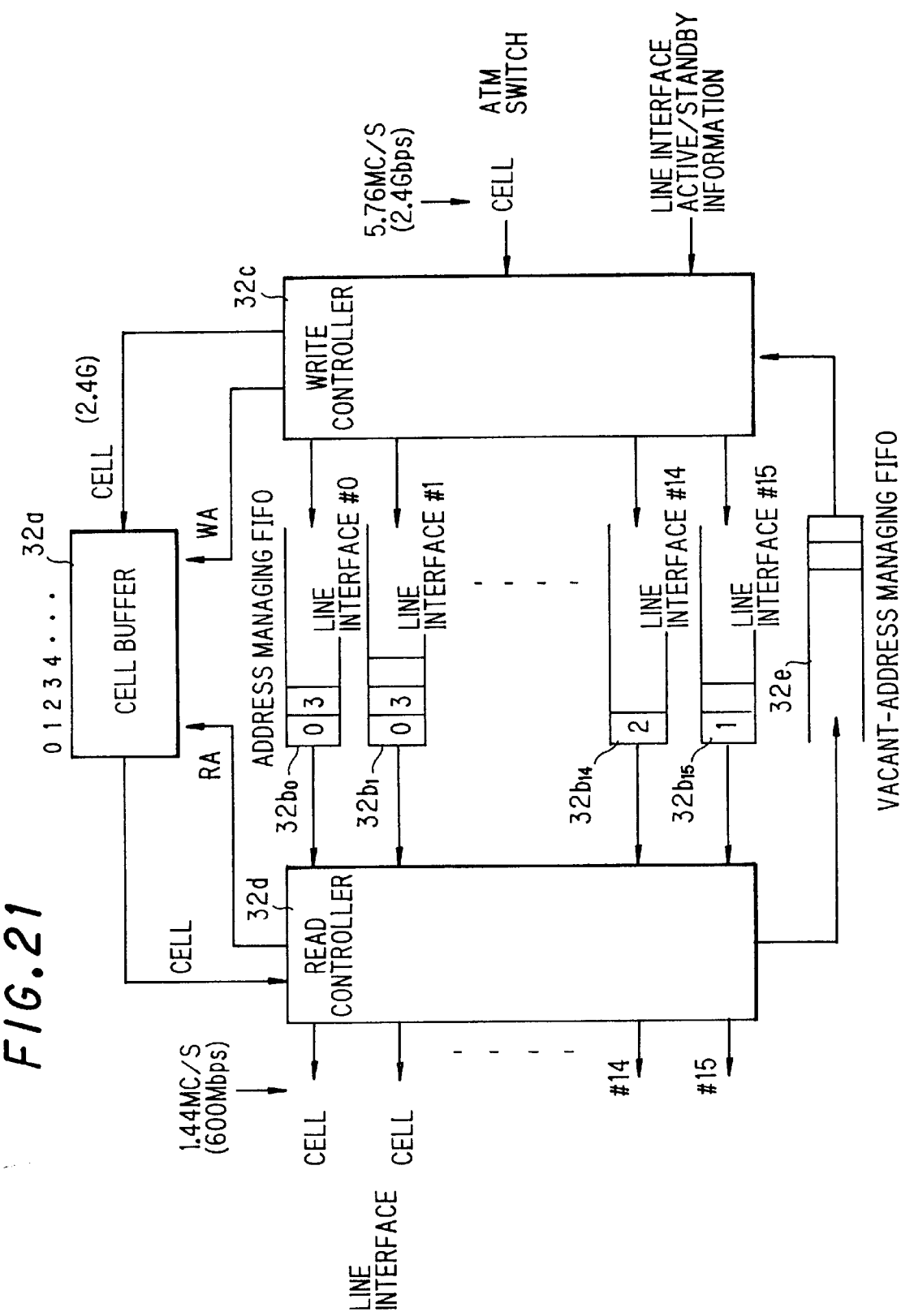

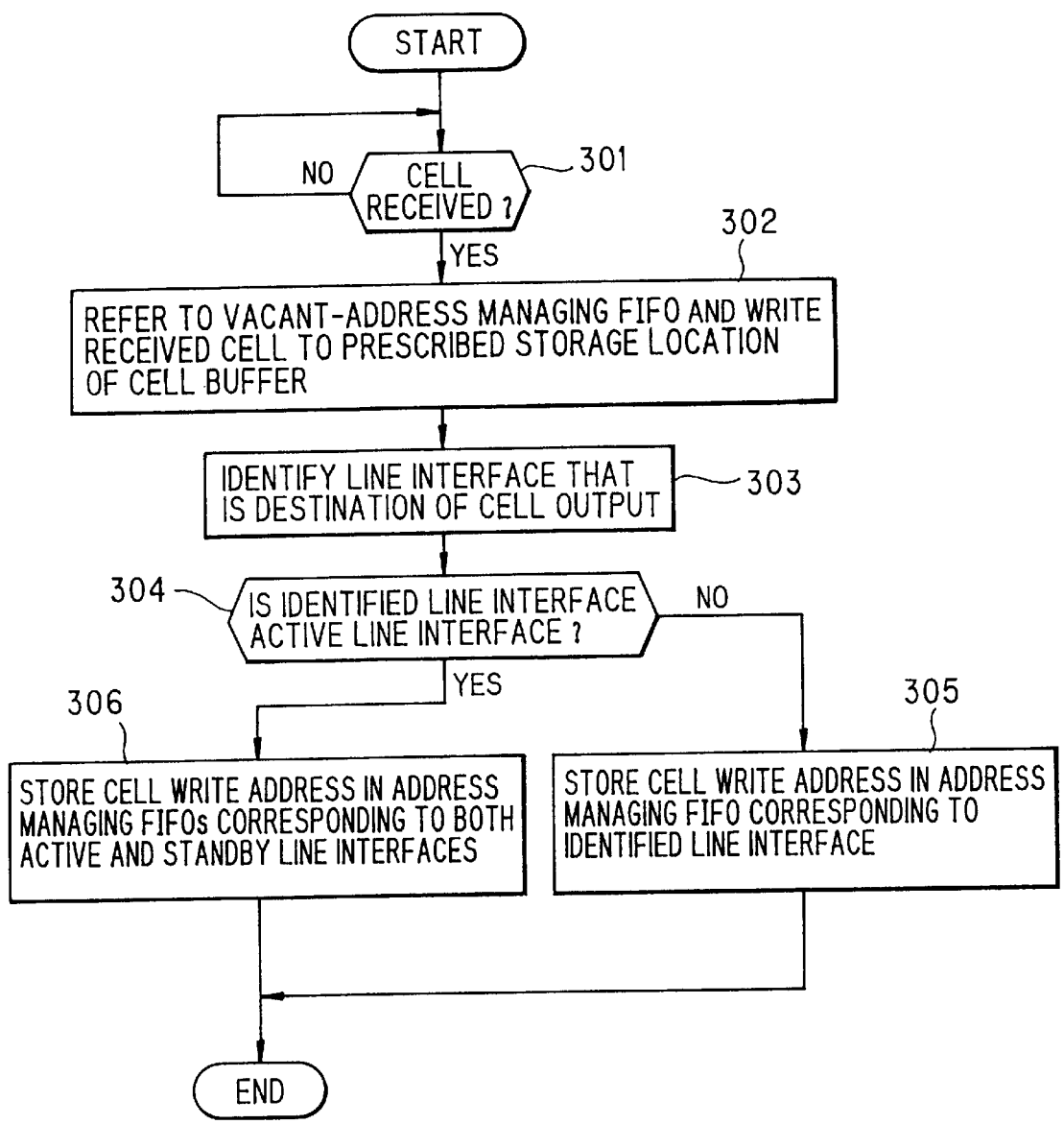

ns to the out of the cell address.

ATM SWITCHING SYSTEM

BACKGROUND OF THE INVENTION

This invention relates to an ATM switching system and, more particularly, to an ATM switching system for converting a VPI/VCI included in the header of a cell to a cell address having a number of bits smaller than the number of bits of the VPI/VCI, and controlling the management of various data and the switching of cells based upon the cell address.

There is increasing demand not only for audio communication and data communication but also for multimedia communication in which moving pictures are transmitted as well as audio and data. B-ISDN (broadband-ISDN) switching technology, which is based upon an asynchronous transfer mode (ATM), is being put to practical use as a means for realizing broadband communication for multimedia communication.

In an ATM transmission system, all information is transferred at high speed upon being converted to fixed information referred to as cells or packetst More specifically, in an ATM transmission system, physical links are multiplexed on a physical line to thereby allocate the line to a plurality of calls. Moving-picture data or audio data from a terminal corresponding to each call are broken down into fixed-length information units (referred to as "cells or packets"), and the cells are transmitted over a line sequentially to realize multiplexing.

As shown in FIG. 23A, a cell is composed of a fixed-length block of 53 bytes of which five bytes constitute a header HD and 48 bytes an information field (payload) DT. In order that the destination will be understood even after data are broken down into blocks, the header HD includes a virtual channel identifier (VCI) for call identifying purposes. The header HD further includes a virtual path identifier (VPI) that identifies a path, a generic flow control (GFC) used in flow control between links, payload type (PT) and a head error control (HEC), which is a code for correcting errors in the header. A combination of VPI/VCI identifies a connection on which a cell is routed.

FIG. 24 is a diagram for describing an ATM switch, which has an ATM switch unit 1, a VCC (virtual channel converter) 2 and a call processor 3 for processing calls. The VCC 2 has VCC circuits $2_1 \sim 2_3$ corresponding to incoming lines #1~#3. Each VCC circuit adds a tag TAG (see FIG. 23B) onto a cell that has entered from the corresponding incoming line, replaces the VCI included in this cell with another VCI and then sends the cell to the ATM switch unit 1. When a call is originated, the call processor 3 performs call control, decides the VCI of the call, decides the tag for routing and writes the tag and the replacement VCI in a VCC table (not shown) of the VCC circuit in which the cell corresponding to the call enters. When call control is finished and the cell enters a prescribed incoming line via a higher ranking ATM switch, the VCC circuit connected to this incoming line reads control information (the tag TAG and VCI), which conforms to the VCI that has been added onto the input cell, from a routing table. The VCC circuit adds the tag TAG onto the cell, replaces the VCI of this tag with the VCI that has been read out and then sends the cell to the ATM switch unit 1. The latter switches the cell on the basis of the tag TAG so that the cell is sent to the prescribed outgoing line.

The ATM switch unit 1 includes tag information detection circuits $I_1 \sim I_3$, transmission information delay circuits $D_1 \sim D_3$, demultiplexers $DM_1 \sim DM_3$ and tag information decoding circuits $DEC_1 \sim DEC_3$, which construct a cell distribution unit CELD, buffer memories such as FIFO (first-in, first-out) memories $FM_{11} \sim FM_{33}$, selectors $SEL_1 \sim SEL_3$, and arrival order management FIFOs $AOM_1 \sim AOM_3$. Each arrival order management FIFO ($AOM_1 \sim AOM_3$) is connected to the output terminals of the information decoding circuits $DEC_1 \sim DEC_3$ and stores the order in which cells arrive at the corresponding three buffer memories $FM_{11} \sim FM_{13}$, $FM_{21} \sim FM_{23}$, $FM_{31} \sim FM_{33}$. These FIFOs control the corresponding selectors $SEL_1 \sim SEL_3$ so that cells are read out of the three buffer memories in the order of cell arrival and sent to outgoing lines #1~#3.

A cell which enters the ATM switch unit 1 has the structure shown in FIG. 23B. The detection circuits $I_i$ (i=1~3) extract the tag information contained in the input signal and send the information to the decoder circuits DECI (i=1~3). If the entering tag information TAG indicates the output terminal #j (j=1~3), the decoder circuit $DEC_i$ operates the demultiplexer $DM_i$ by a changeover signal $S_i$ to send the transmission information to the FIFO memory $FM_{ji}$. For example, if the tag TAG contained in the cell which has entered from the input terminal #1 indicates output terminal #2, the decoder circuit $DEC_1$ operates the demultiplexer $DM_1$ so that the information from the input terminal #1 enters FIFO $FM_{21}$.

The arrival order management FIFOs ($AOM_i \sim AOM_3$) are each connected to the output terminals of the tag information decoding circuits $DEC_1 \sim DEC_3$ and store the order in which cells arrive at the corresponding three buffer memories $FM_{11} \sim FM_{33}$, $FM_{21} \sim FM_{23}$, $FM_{31} \sim FM_{33}$. For example, if cells arrive in the order of buffer memories $FM_{11} \rightarrow FM_{12} \rightarrow FM_{13} \rightarrow FM_{12} \rightarrow \ldots$, buffer memory identification codes are stored in the arrival order management FIFOs ($AOM_i \sim AOM_3$) in the order of cell arrival, i.e., in the manner $1 \rightarrow 2 \rightarrow 3 \rightarrow 2 \rightarrow \ldots$. Thereafter, the arrival order management FIFOs ($AOM_i \sim AOM_3$) control the corresponding selectors $SEL_1 \sim SEL_3$ so that cells are read out of the three buffer memories $FM_{11} \sim FM_{33}$, $FM_{21} \sim FM_{23}$, $FM_{31} \sim FM_{33}$ in the order of cell arrival and sent to the outgoing lines #1~#3.

A buffer function is thus obtained by providing each buffer memory $FM_{ij}$ with a capacity equivalent to a plurality of cells. This makes it possible to deal satisfactorily with a case in which there is a temporary increase in transmission data. Further, since cells are read out of the buffer memories $FM_{i1} \sim FM_{i3}$ ($FM_{11} \sim FM_{33}$, $FM_{21} \sim FM_{23}$, $FM_{31} \sim FM_{33}$) in the order of cell arrival, equal numbers of cells reside in the buffer memories $FM_{i1} \sim FM_{i3}$. This makes it possible to eliminate situations in which cells are discarded owing to overflow of the buffer memories.

Though not illustrated, a number of subscriber interface units or line interface units connected to transmission lines and a line concentrator for concentrating cells, which are output by the subscriber interface units or line interface units, and entering the cells into the VCC lines $2_1 \sim 2_3$, are provided at the input stage to the VCC circuits $2_1 \sim 2_3$. Further, The outgoing lines #1~#3 of the ATM switch 1 are provided with a line deconcentrator for deconcentrating cells, which have entered from the ATM switch unit 1, on a per-subscriber interface basis or per line interface basis, and entering the cells into the interface units.

The ATM switch, which is a system which performs switching in units of the VPI/VCI contained in the cell headers, carries out UPC (Usage Parameter Control), billing control and other processing based upon the VPI/VCI value. In accordance with recommendations, the VPI/VCI is represented by a total of 28 bits (the VPI is 12 bits and the VCI is 16 bits). However, depending upon the ATM switching system, it is often unnecessary to manage a large volume of connections of VPI+VCI=28 bits simultaneously. In the prior art, however, various processing and switching operations are executed based upon a VPI/VCI of 28 bits even in such case. As a result, various tables and processing circuits are unnecessarily large, thereby raising the cost of the ATM switching system.

In order to make it possible to continue service even in the event of a failure, it has been contemplated to provide redundancy for the subscriber interfaces or line interfaces in an ATM switching system (the following discussion will deal with subscriber interfaces). In such case the line concentrator is required to concentrate only cells output by the active subscriber interfaces and enter these cells into the ATM switch unit. More specifically, it is required that the line concentrator concentrate cells upon deleting cells output by the standby subscriber interfaces. On the other hand, when the deconcentrator deconcentrates cells, which are output by the ATM switch unit, on a per-active subscriber interface basis and sends the cells to the subscriber interface, the deconcentrator must send the cells to the standby subscriber interfaces as well. The problem which arises in the prior art is that control for concentrating cells and for deconcentrating cells cannot be performed in simple fashion in a case where such active and standby subscriber interfaces exist.

Further, in various ATM products, the foremost of which is the ATM switch, the cell concentrator and deconcentrator are important functional elements that decide performance. Consequently, there is demand for a line concentrator and deconcentrator capable of implementing the line concentration and deconcentration required in an ATM switching system.

SUMMARY OF THE INVENTION

Accordingly, a first object of the present invention is to provide a switching system that is capable of performing various processing and switching without relying upon a connection identification (VPI/VCI).

A second object of the present invention is to provide a switching system that is capable of performing control for cell concentration and cell deconcentration even when active/standby line interfaces exist.

A third object of the present invention is to provide a concentrator and a deconcentrator capable of lmplementing the concentration and deconcentration required in an ATM switching system.

In accordance with the present invention, the first object is attained by providing a switching system for concentrating packet streams from respective ones of a plurality of line interfaces and entering a resulting packet stream into a switch unit, and deconcentrating packets from the switch unit on a per line interface basis, wherein each line interface has a first packet address converter for converting a connection identification included in a header of a packet to a packet address having a number of bits smaller than the number of bits of the connection identification, and a second packet address converter for converting a packet address, which is included in the header of a packet that enters from the switch side, to a connection identification, the system including means for controlling management of various data and switching of packets based upon the packet address.

In accordance with the present invention, the second object is attained by providing a switching system in which frame signals having a prescribed format are made packet streams and output by a plurality of line interfaces, the packet streams output by respective ones of the plurality of line interfaces are concentrated and entered into a switch unit by a concentrator, packets that have been switched by the switch unit are demultiplexed on a per line interface basis by a deconcentrator, and resulting packet streams are made the frame signals and transmitted by the line interfaces, wherein each line interface has data add-on means for adding, onto a cell header, active/standby identification data indicating whether its own line interface is active or standby, the concentrator has means for identifying, based upon the active/standby identification data, whether a packet that has entered from a line interface is an active packet or a standby packet, and discarding a standby packet, and means for concentrating only packets other than standby packets and entering these packets into the switch unit, and the deconcentrator has means for deconcentrating packets, which have entered from the side of the switch, on a per line interface basis, and means for entering deconcentrated packets into active and standby line interfaces.

In accordance with the present invention, the third object is attained by providing a packet concentrator apparatus for concentrating packet streams, which enter from respective ones of a plurality of line interfaces, by a concentrator and entering a resulting packet stream into a switch unit, comprising a time-division multiplexer for time-division multiplexing packets output by the plurality of line interfaces, a packet buffer for storing packets output by the time-division multiplexer, and means for reading packets out of the packet buffer at a prescribed speed and entering the packets into the switch unit.

Further, in accordance with the present invention, the third object is attained by providing a packet deconcentrator apparatus for deconcentrating packets, which have been switched by a switch unit, by a deconcentrator on a per line interface basis, comprising a packet buffer for storing packets that have entered from the switch unit, an address managing FIFO, provided in correspondence with each outgoing line, for storing an address of the packet buffer in which a packet has been stored, a write controller for storing a packet at a prescribed address of the packet buffer and storing the address data in an address managing FIFO corresponding to an outgoing line to which the above-mentioned packet is sent, and a read controller for performing scanning cyclically to determine whether address data have been stored in each address managing FIFO, and, if address data have been stored in a prescribed address managing FIFO, reading a packet from a storage area of the packet buffer designated by these address data and entering the packet into a line interface to which the outgoing line corresponding to this address managing FIFO is connected.

Other features and advantages of the present invention will be apparent from the following description taken in conjunction with the accompanying drawings.

BRIEF DESCRIPTION OF THE DRAWINGS

FIGS. 6A, 6B are diagrams for describing cell formats;

FIG. 14 is a diagram showing the construction of a line deconcentrator (corresponding to the line interface of a LINE/CARD);

FIG. 21 is a diagram showing the construction of a line deconcentrator in a case where a multiplexed line interface exists;

FIG. 22 is a flowchart of processing executed by a write controller in a case where a multiplexed line interface exists;

DESCRIPTION OF THE PREFERRED EMBODIMENTS (A) Overview of the Invention (a) Configuration FIG. 1 is a diagram for describing the principle of the present invention.

Figure 1:
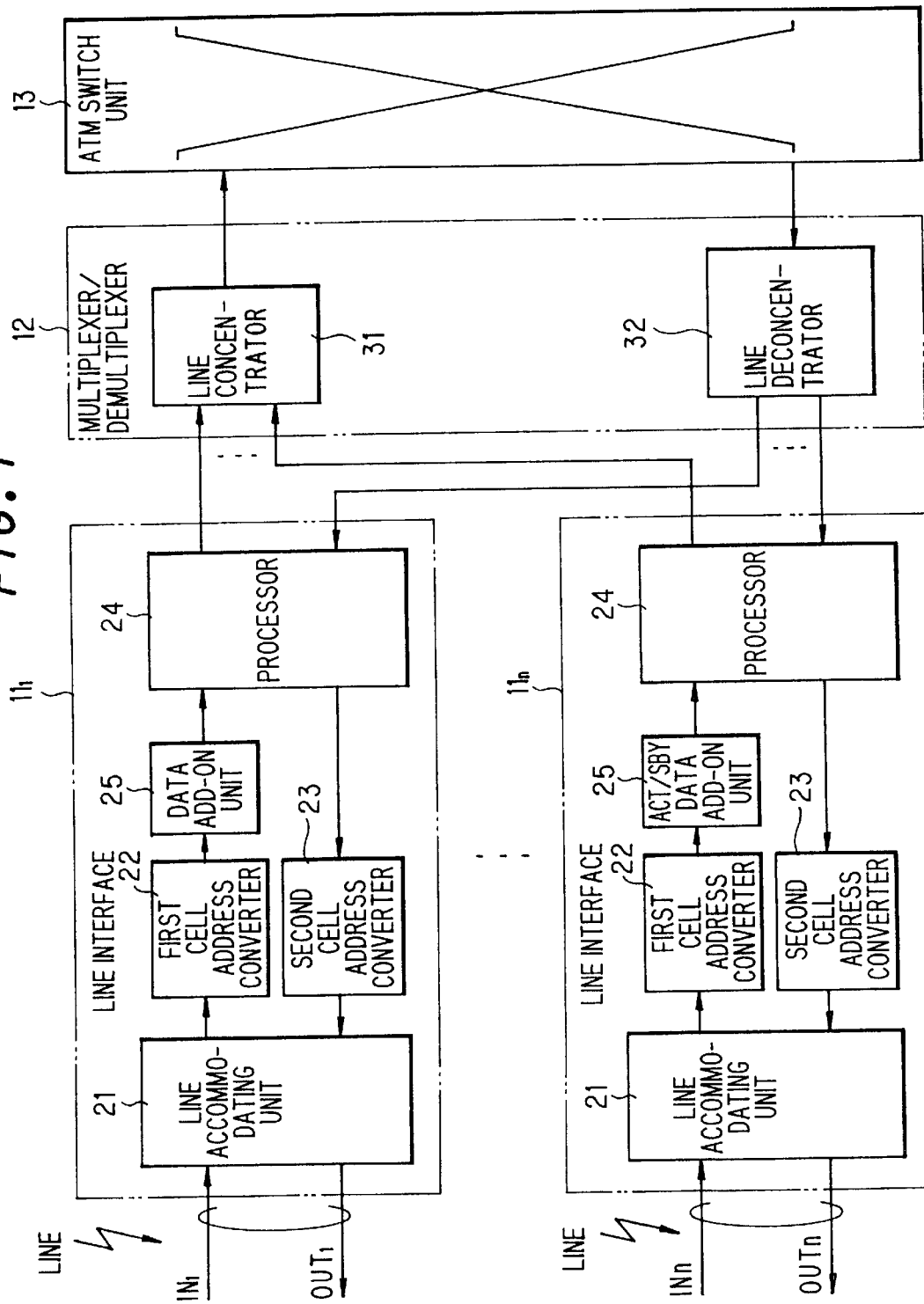
FIG. 1 is a block diagram for describing the principle of the present invention.

Shown in FIG. 1 are line interfaces $11_1 \sim 11_n$ such as subscriber interfaces connected to respective transmission lines (respective incoming lines $IN_1 \sim IN_n$ and outgoing lines $OUT_1 \sim OUT_n$), a multiplexer/demultiplexer 12 and an ATM switch unit 3. Each line interface includes a line accommodating unit 21 for outputting, in the form of a cell stream, a frame signal that has entered from the corresponding incoming line and has a prescribed format, and for sending to the corresponding outgoing line, in the form of a frame signal having the above-mentioned prescribed format, a cell stream that has entered from the ATM switch side; a first cell address converter (cell address degenerating converter) 22 for converting a VPI/VCI included in the header of a cell to a cell address having a number of bits smaller than the number of bits of the VPI/VCI; a second cell address converter (cell address expanding converter) 23 for converting a cell address, which is included in the header of a cell that enters from the ATM switch side, to a VPI/VCI; a processor 24 for performing UPC (Usage Parameter Control), billing control and other processing based upon a cell address; and a data add-on unit 25 for adding, onto a cell header, active/standby identification data indicating whether its own line interface is active or standby. The multiplexer/demultiplexer 12 includes a line concentrator 31 for concentrating cell streams output by each of the plurality of line interfaces $11_{11} \sim 11_{1n}$ and entering the resulting signal into the ATM switch unit 13, and a line deconcentrator 32 for deconcentrating a cell stream, which has been switched by the ATM switch unit 13, on a per line interface basis, and entering the resulting signal into each line interface.

(b) Description of First Aspect of the Invention

Frame signals having a prescribed format are made cell streams by the line accommodating units 21 of the respective line interfaces $11_1 \sim 11_n$. The first cell address converter 22 converts the VPI/VCI contained in the header of the cell that has entered from the line accommodating unit 21 to a cell address having fewer bits that the VPI/VCI and then outputs the cell address. The line concentrator 31 concentrates the cell streams that enter from the plurality of line interfaces and enters the resulting signal into the ATM switch unit 13. The line deconcentrator 32 deconcentrates cells, which have been switched by the ATM switch unit 13, on a per line interface basis and enters the resulting signal into each line interface. The second cell address converter 23 of each line interface converts the cell address, which is contained in the header of the cell that has entered from the line deconcentrator 32, to a VPI/VCI and enters the VPI/VCI into the line accommodating unit 21. The line accommodating unit 21 converts the input cell stream to the above-mentioned frame signal and sends the frame signal out on the corresponding outgoing line. The processor 24 performs UPC, billing control and other processing based upon the particular cell address. Thus, the VPI/VCI is converted to an address having fewer bits that the above-mentioned VPI/VCI and various processing is executed based upon this cell address. As a result, the amount of hardware for various tables and processing circuits can be reduced.

(c) Description of Second Aspect of the Invention

In an ATM switching system in which prescribed line interfaces are active and other line interfaces are standby, the data add-on unit 25 of each line interface adds active/standby identification data, which indicate whether its own line interface is active or standby, onto a cell and enters the cell into the line concentrator 31. On the basis of the active/standby identification data, the line concentrator 31 determines whether the cell that has entered from each line interface is a cell from the active system or a cell from the standby system, discards cells from the standby system, concentrates only cells (namely active cells) other than standby cells and enters the resulting signal into the ATM switch unit 13. The line deconcentrator 32 determines whether the line interface that is the destination of a cell that has entered from the ATM switch unit 13 has been duplexed or not (i.e., whether it is active or not). If this line interface has been duplexed, then the line deconcentrator 32 enters this cell into both of the active and standby line interfaces. By adopting this arrangement, cell concentration and cell deconcentration can be controlled in a simple manner even in a case where active and standby line interfaces exist.

(d) Description of Third Aspect of the Invention (d-1) Line Concentrator

Figure 10:
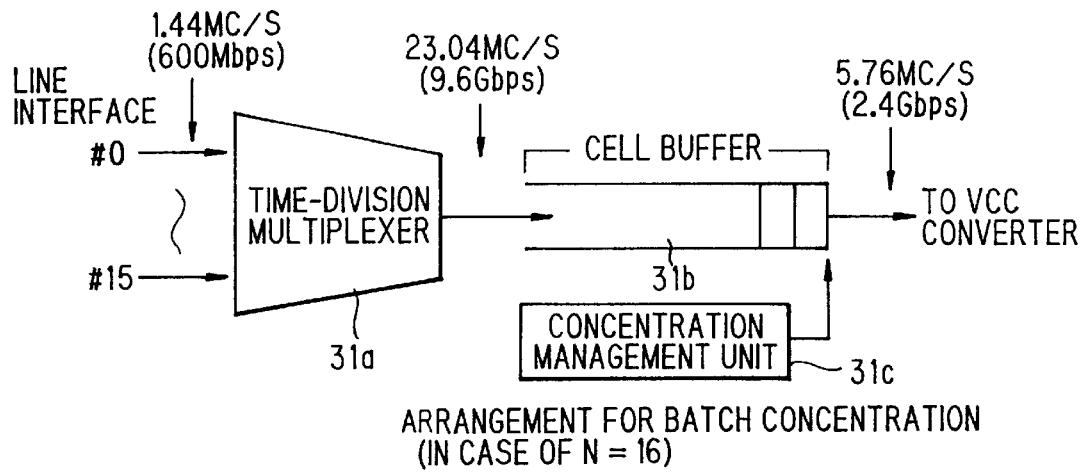
FIG. 10 is a diagram showing the construction of a line concentrator (batch concentration)
Figure 11:
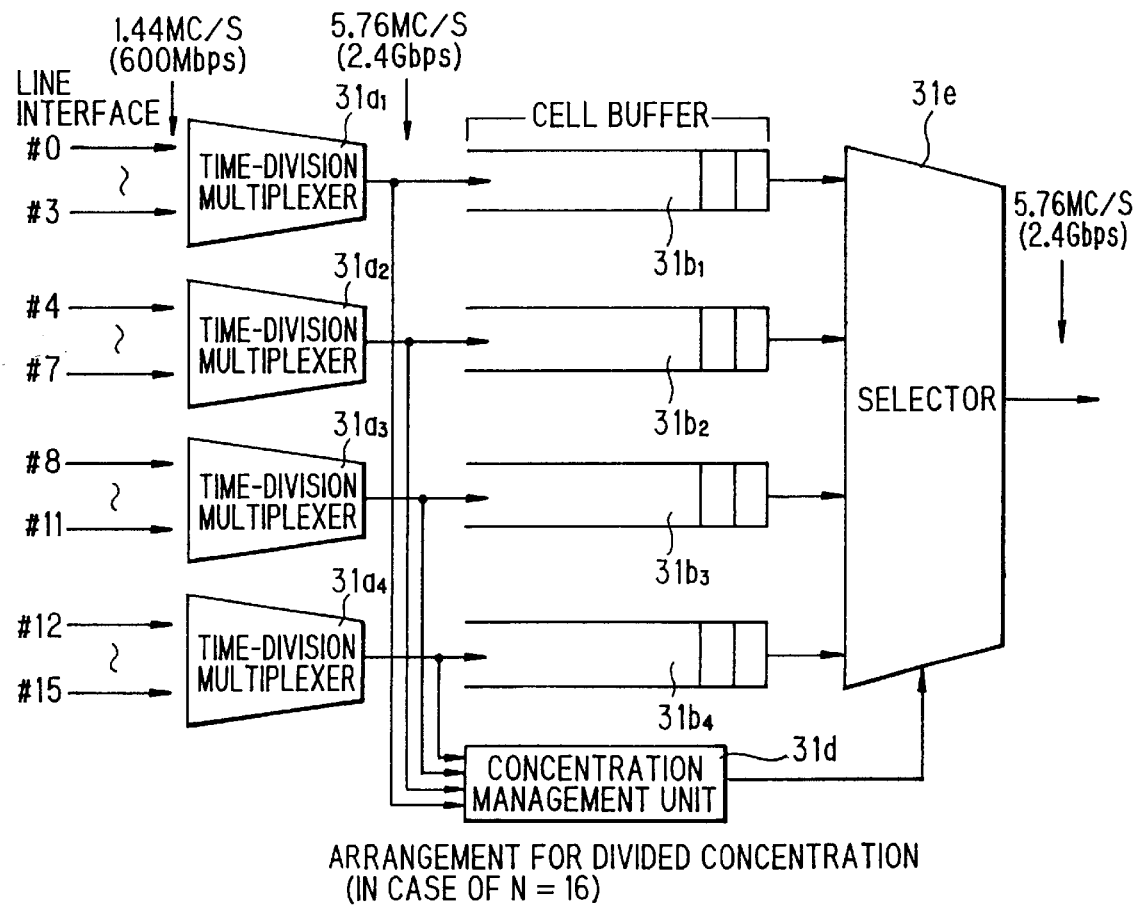
FIG. 11 is a diagram showing the construction of a line concentrator (divided concentration)

The line concentrator 31 comprises a time-division multiplexer 31a for time-division multiplexing of cells output by a plurality line interfaces, as shown in FIG. 10, described later, a cell buffer 31b for storing cells output by the time-division multiplexer 31a, and means 31c for reading cells out of the cell buffer 31b at a prescribed speed and entering the cells into the ATM switch unit. As a result of this arrangement, cells can be entered into the ATM switch unit 13 upon undergoing batch concentration. Further, as illustrated in FIG. 11, described later, the line concentrator 31 comprises a plurality of time-division multiplexers $31a_1 \sim 31a_4$ each of which is for time-division multiplexing of cells output by a plurality of line interfaces, a plurality of cell buffers $31b_1 \sim 31b_4$ for storing cells output by respective ones of the time-division multiplexers, a management unit 31d for managing, in order of storage, the sequence of cell buffers in which cells are stored, and means 31e for reading cells out of the cell buffers in the order of storage and at a prescribed speed and entering the read cells into the ATM switch unit. As a result of this arrangement, cells can be entered into the ATM switch unit upon undergoing divided concentration. Further, an ATM system can be constructed by selecting a line concentrator for either batch or divided concentration.

(d-2) Line Deconcentrator

Figure 12:
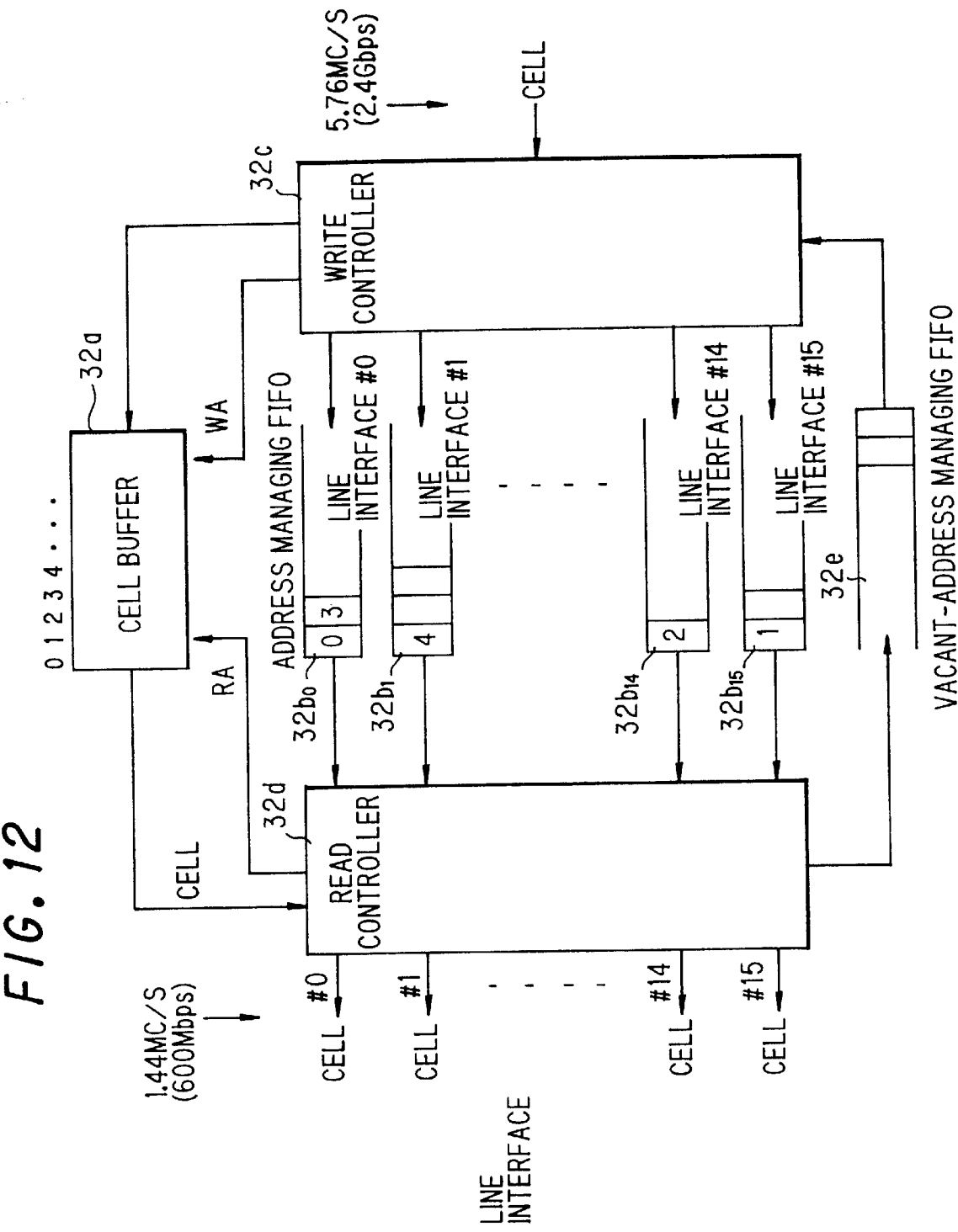
FIG. 12 is a diagram showing the construction of a line deconcentrator (corresponding to the line interface of a MULTI-LINE/CARD)

As shown in FIG. 12, described later, the line deconcentrator 32 comprises a cell buffer 32a for storing cells that have entered from the ATM switch unit 13, address managing FIFOs ($32b_0 \sim 32b_{15}$) provided to correspond to outgoing lines for storing the addresses of the cell buffer in which cells have been stored, a write controller 32c for storing cells at prescribed addresses of the cell buffer and storing the address data in the address managing FIFOs corresponding to outgoing lines to which the above-mentioned cells are sent, and a read controller 32d for performing scanning cyclically to determine whether address data have been stored in each address managing FIFO, and, if address data have been stored in a prescribed address managing FIFO, reading a cell from a storage area of the cell buffer designated by these address data and entering the cell into a line interface to which the outgoing line corresponding to this address managing FIFO is connected. By using this line deconcentrator, cells can be demultiplexed en bloc up to the line operating rate (batch cell deconcentration).

Further, the line deconcentrator 32 comprises a cell buffer for storing cells that have entered from the ATM switch unit, address managing FIFOs provided to correspond to line interfaces for storing the addresses of cell buffers in which cells have been stored, a write controller for storing cells at prescribed addresses of the cell buffers and storing the address data in the address managing FIFOs corresponding to line interfaces to which the above-mentioned cells are sent, and a read controller for performing scanning cyclically to determine whether address data have been stored in each address managing FIFO, and, if address data have been stored in a prescribed address managing FIFO, reading a cell from a storage area of the cell buffer designated by these address data and entering the cell into the line interface corresponds to this address managing FIFO. By using this line deconcentrator, the cell stream that enters from the ATM switch unit can be separated into a plurality of cell streams of highway speed and then each individual cell stream can be separated into cells of the operating line rate by the line interface (divided cell deconcentration).

Thus, as described above, cells can be deconcentrated by suitably employing either batch cell deconcentration or divided cell deconcentration.

(B) Overall Construction of ATM Switching System

Figure 2:
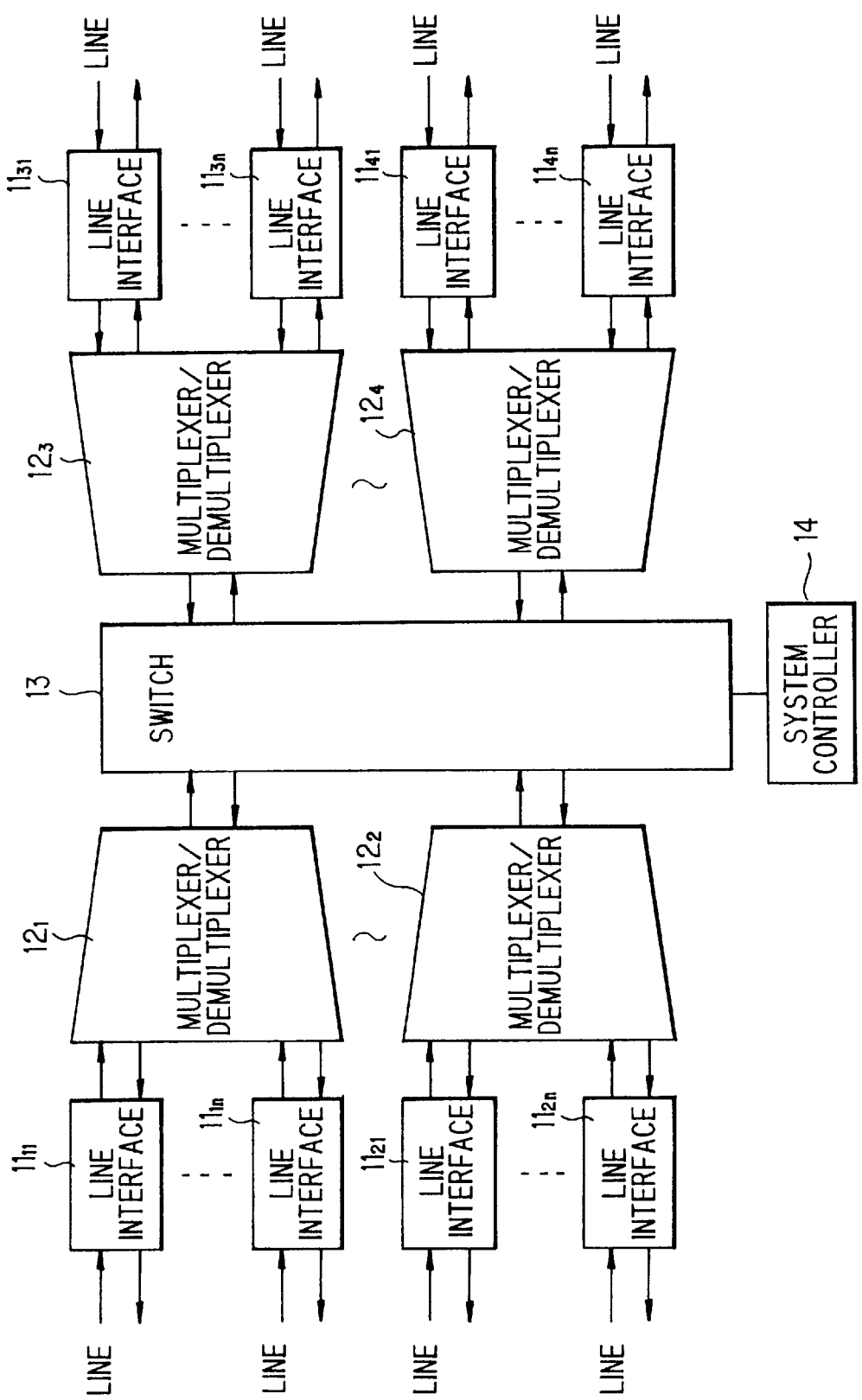
FIG. 2 is a block diagram illustrating the configuration of an ATM switching system.

FIG. 2 is a block diagram illustrating the configuration of an ATM switching system according to the present invention. Shown in FIG. 2 are line interfaces (line IFs) $11_{11} \sim 11_{1n}$, $11_{21} \sim 11_{2n}$, $11_{31} \sim 11_{3n}$, $11_{41} \sim 11_{4n}$ such as subscriber interfaces connected to corresponding transmission lines, multiplexer/demultiplexers $12_1 \sim 12_4$, an ATM switch unit 13 and a system controller 14.

The ATM switch unit 13 is connected to the plurality of multiplexer/demultiplexers $12_1 \sim 12_4$ and outputs input cells from certain multiplexer/demultiplexers to the pertinent multiplexer/demultiplexers. The multiplexer/demultiplexers $12_1 \sim 12_4$, which are connected to respective ones of the plurality of line interfaces $11_{11} \sim 11_{1n}$, $11_{21} \sim 11_{2n}$, $11_{31} \sim 11_{3n}$, $11_{41} 11_{4n}$, multiplex (concentrate) outgoing cells from a plurality of line interfaces and output the cells to the ATM switch unit 13. Furthermore, the multiplexer/demultiplexers $12_1 \sim 12_4$ demultiplex and output incoming cells, which arrive from the ATM switch unit 13, to the pertinent line interfaces.

The line interfaces $11_{11} \sim 11_{4n}$, which are connected to the corresponding multiplexer/demultiplexers $12_1 \sim 12_4$, form frame data of a prescribed format arriving from the lines into cells and then output the cells to the multiplexer/demultiplexers. Furthermore, the line interfaces $11_{11} \sim 11_{4n}$ convert incoming cells from the multiplexer/demultiplexers $12_1 \sim 12_4$ to frame data of a prescribed format specified on the lines and then send the frame data to the subscribers via the outgoing lines. The system controller 14 controls the line interfaces $11_{11} \sim 11_{4n}$, multiplexer/demultiplexers $12_1 \sim 12_4$ and ATM switch unit 13.

(C) Line Interfaces

There are two types of line interfaces, namely a line interface of LINE/CARD construction, in which a single card accommodates a single line, and a line interface of MULTI-LINE/CARD construction, in which a single card accommodates a plurality of lines.

(a) Line Interface of LINE/CARD Construction

Figure 3:
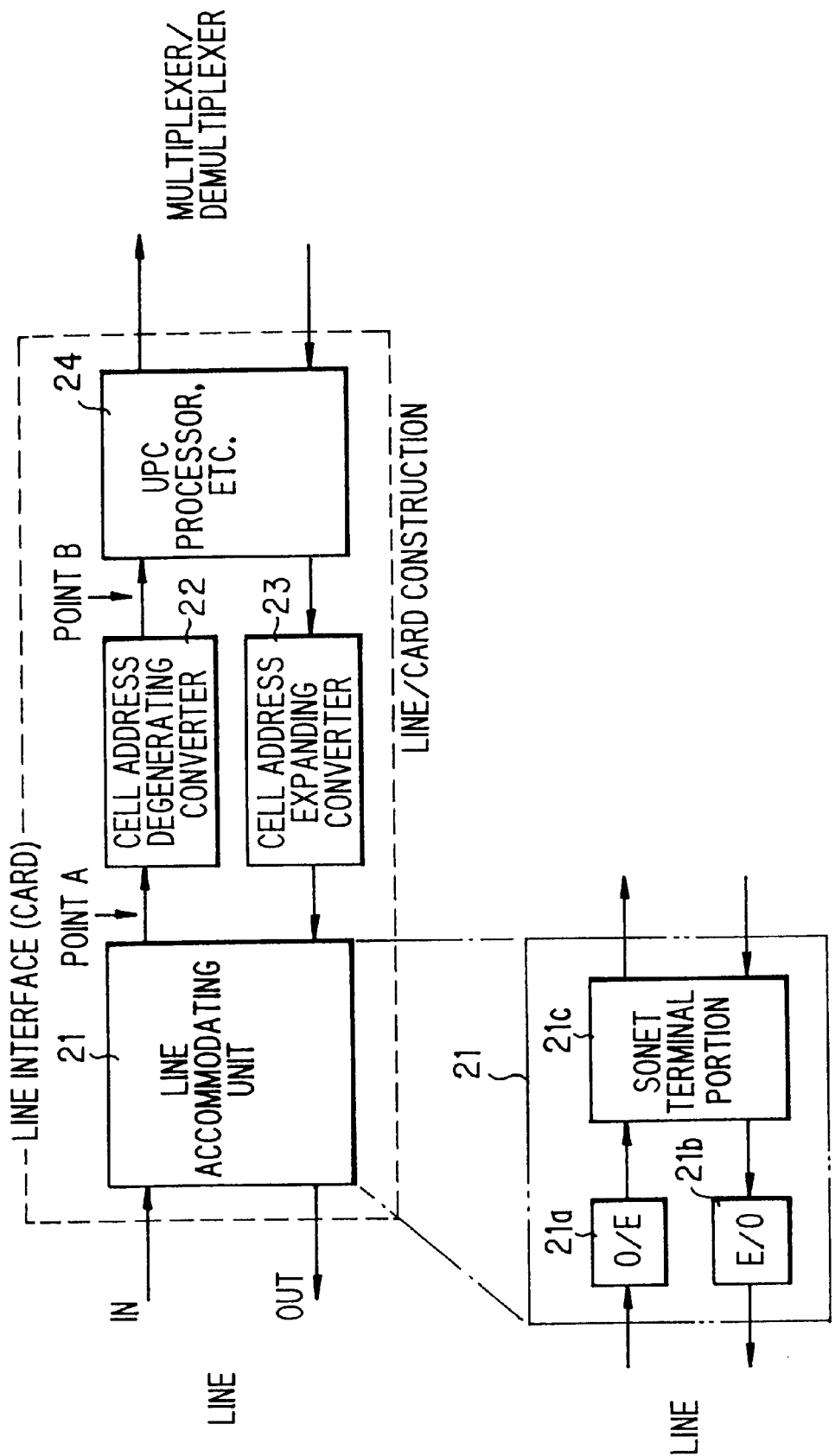
FIG. 3 is block diagram showing the construction of a line interface (the construction of a LINE/CARD)

FIG. 3 is a diagram showing the line interface of LINE/CARD construction. The line interface includes the line accommodating unit 21 for outputting, in the form of a cell stream, a frame signal that has entered from the corresponding incoming line and has a prescribed format, and for sending to the corresponding outgoing line, in the form of a frame signal having the above-mentioned prescribed format, a cell stream which has entered from the ATM switch side; the first cell address converter (cell address degenerating converter) 22 for converting a VPI/VCI included in the header of a cell to a cell address ICID (Internal Channel Identifier) having a number of bits smaller than the number of bits of the VPI/VCI; the second cell address converter (cell address expanding converter) 23 for converting a cell address, which is included in the header of a cell that enters from the ATM switch side, to a VPI/VCI; and the processor 24 for performing UPC (Usage Parameter Control), billing control and other processing based upon a cell address. UPC is control which involves monitoring to see whether a declared value of transmission capacity and actual cell inflow volume agree, and discarding cells that are in contravention of stipulations when it is found that cells in excess of the declared value have flowed in. Billing control involves counting the number of ATM cells that pass and creating billing data accordingly.

Line Accommodating Unit

Figure 4:
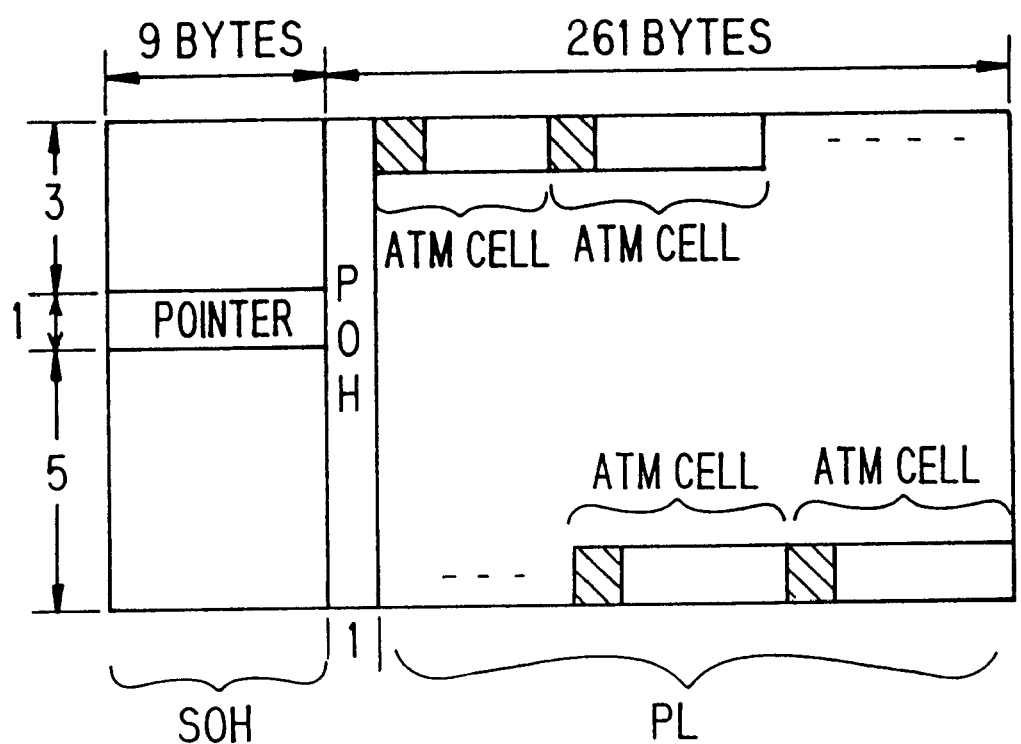
FIG. 4 is a diagram for describing a SONET STS-3C frame format.

In a case where a transmission line is constituted by an optical cable, the line accommodating unit 21 has an opto-electric converter (O/E) 21a for converting an optical signal to an electric signal, an electro-optical converter (E/O) 21b for converting an electric signal to an optical signal, and a SONET terminal portion 21c. As shown in FIG. 4, the SONET terminal portion 21c deletes overhead (section overhead SOH and path overhead POH) from a frame signal having a SONET STC-3C (156 Mbps) format, enters the resulting signal into the first cell address converter 22, converts a cell stream, which has entered from the second cell address converter 23, to a frame having the SONET STC-3C formation shown in FIG. 4, and sends the frame to the line.

One frame consists of 9×270 bytes, as will be appreciated from the SONET STC-3C (156 Mbps) frame format shown in FIG. 4. The first 9×9 bytes are the section overhead SOH and the remaining bytes are the path overhead POH and payload PL. The section overhead SOH transmits (1) information (a frame synchronizing signal) representing the beginning of a frame, (2) information specific to the transmission line (information for checking for error at the time of transmission, information for network maintenance, etc.) and (3) a pointer which indicates the position of the path overhead POH. The path overhead POH transmits inter-network end-to-end monitoring information, and the payload PL transmits 150 Mbps information as an ATM cell.

Cell Address Gegenerating Converter

The cell address degenerating converter 22 converts a 28-bit VPI/VCI (VPI=12 bits, VCI=16 bits) to a cell address ICID having a number of bits (e.g., 13) smaller than the number of bits of the VPI/VCI. The construction of this converter is shown in FIG. 5.

Figure 5:
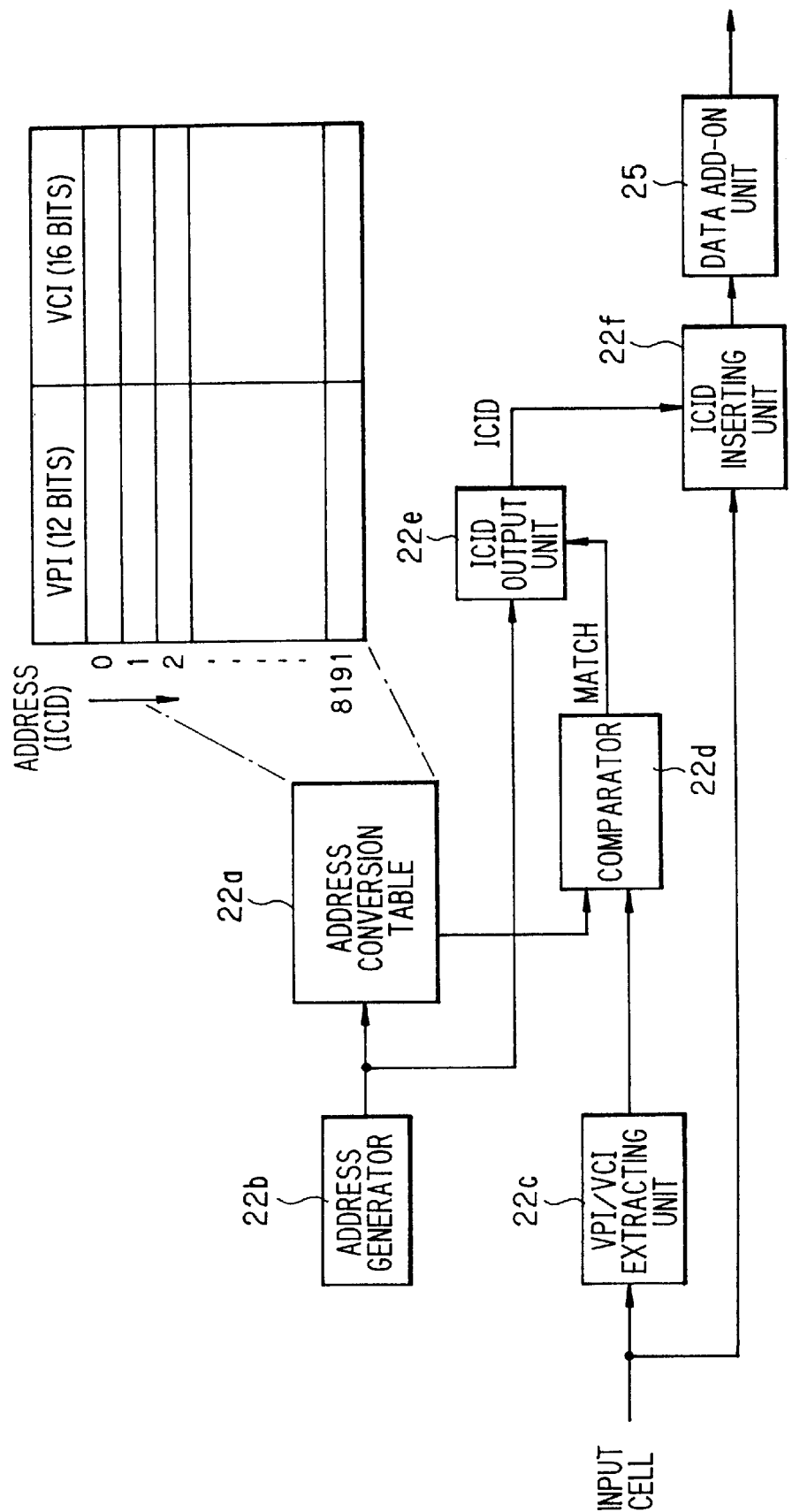
FIG. 5 is a diagram showing the construction of a cell address degenerating converter.

As shown in FIG. 5, the cell address degenerating converter 22 includes an address conversion table 22a for storing VPI/VCI values in correspondence with cell addresses ICID (0, 1, ..., $2^{13}-1$); an address generator 22b for generating cell addresses 0, 1, ..., $2^{13}-1$ cyclically at high speed; a VPI/VCI extracting unit 22c for extracting the VPI/VCI value contained in the header of the input cell; a comparator 22d for comparing the VPI/VCI value read out by the address conversion table 22a and the VPI/VCI value that has been extracted; an ICID output unit 22e which, if the VPI/VCI value read and the VPI/VCI value extracted agree, outputs the address prevailing at such time as the cell address ICID; an ICID inserting unit 22f for inserting the cell address ICID into the cell to replace the VPI/VCI; and a data add-on unit 22g for adding on active/standby identification data, described later.

FIG. 6A shows cell format before the cell address conversion. FIG. 6B shows the cell format after the cell address conversion, in which it is seen that the cell address ICID has been substituted for the VPI/VCI. In these cell formats, system information such as tag information, active/standby identification information and generic flow control (GFC) is written in the system information area. Payload type PT and cell loss priority CLP, etc., are written in the maintenance information area.

Thus, the cell address ICID is mapped in the VPI/VCI area. However, the mapping method differs depending upon whether the connection is a VP connection or VC connection. In the case of the VC connection, ICID can be mapped in the 28-bit area of the VPI/VCI. In the case of the VP connection, on the other hand, it is required that the VCI value be passed through the switching system (i.e., that the VCI not be changed). Accordingly, the VCI value is left in the VCI area and ICID is mapped in the VPI area.

Cell Address Expanding Converter

The cell address expanding converter 23 converts the 13-bit cell address ICID to the 28-bit VPI/VCI. The construction of this converter is shown in FIG. 7.

Figure 7:
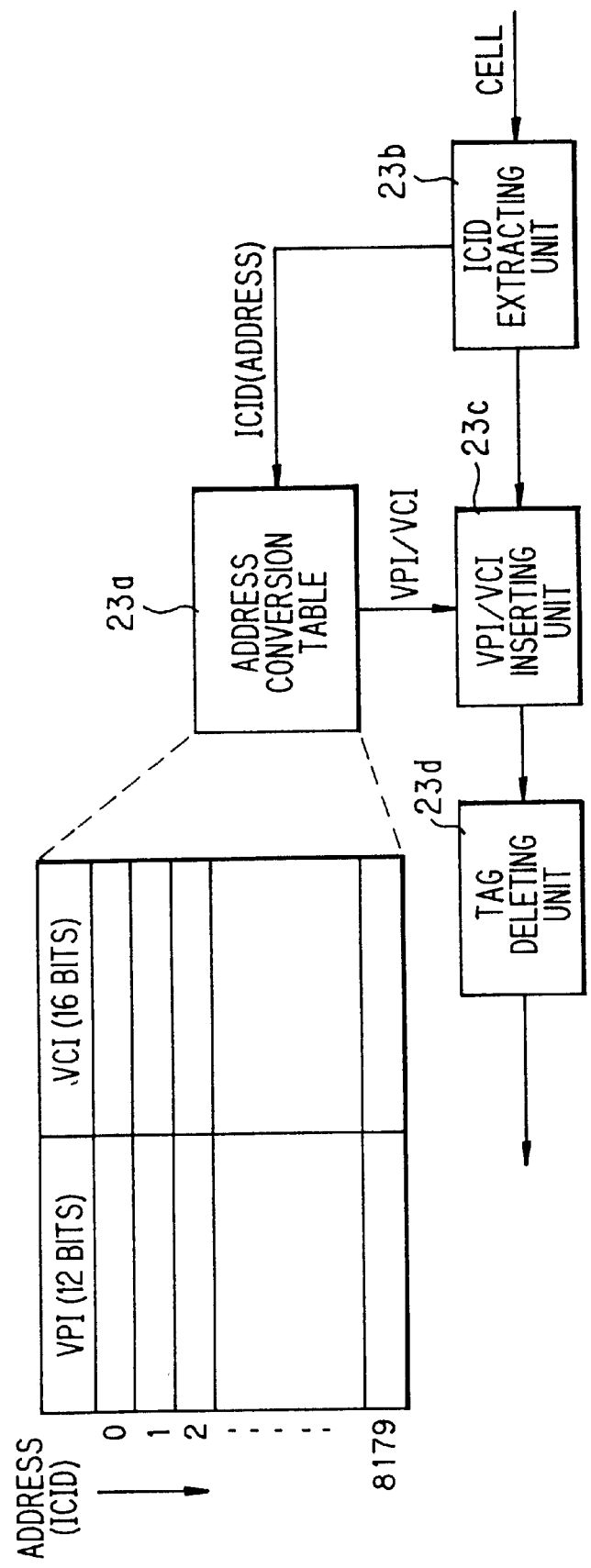
FIG. 7 is a diagram illustrating the construction of a cell address expanding converter.

As shown in FIG. 7, the cell address expanding converter 23 includes an address conversion table 23a for storing 289-bit VPI/VCI values in correspondence with 13-bit cell addresses ICID (0, 1, ... $2^{13}-1$); an ICID extracting unit 23b for extracting the cell address ICID contained in the header of the input cell; a VPI/VCI inserting unit 23c for inserting a VPI/VCI value, which has been read out of a storage area in the address conversion table 23a indicated by the ICID address that has been extracted, into a cell to replace the cell address ICID; and a tag deleting unit 23d. The cell shown in FIG. 6B is converted to the cell having the format of FIG. 6A by the cell address expanding converter 23.

(b) Line Interface of MULTI-LINE/CARD Construction

Figure 8:
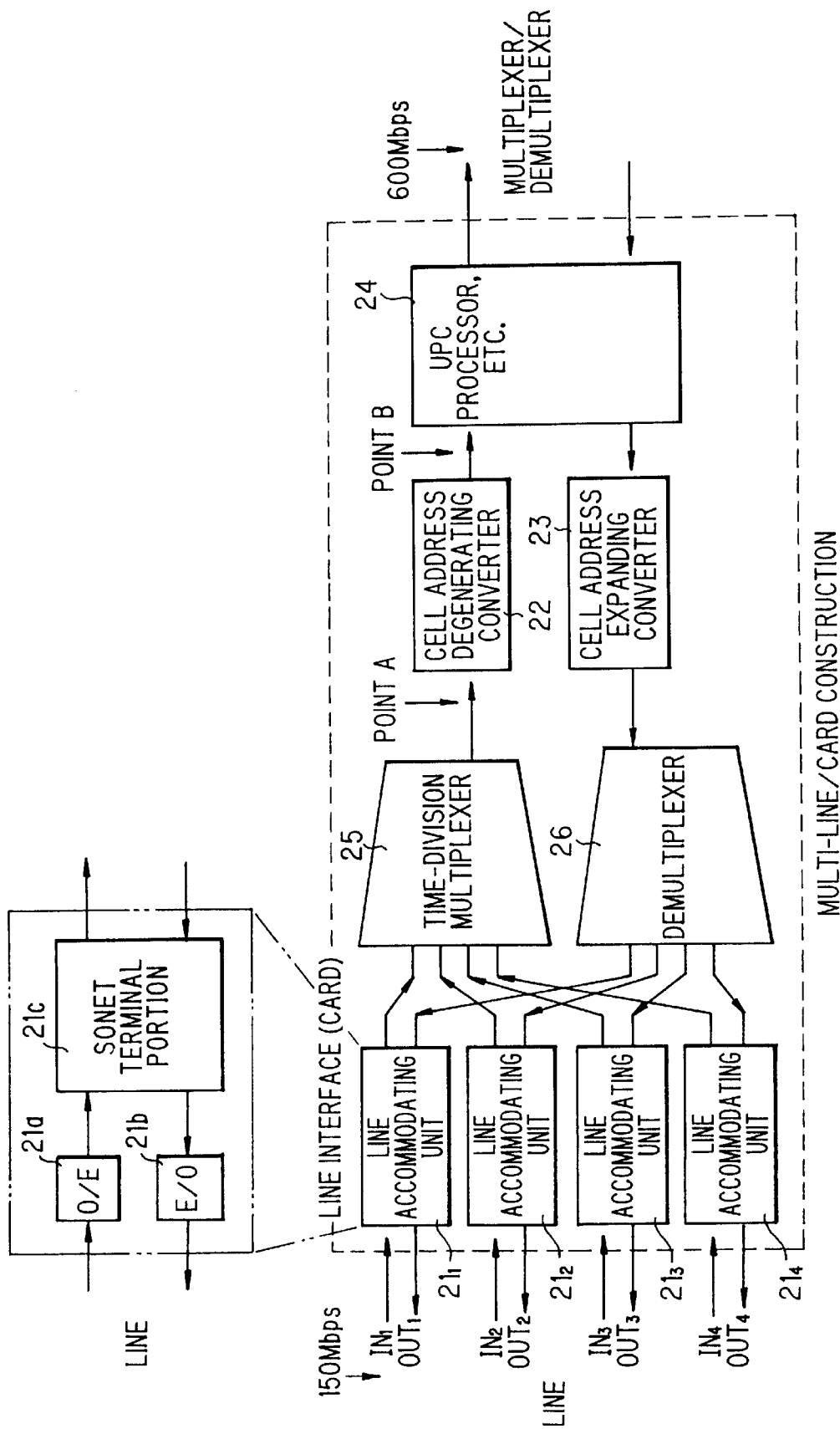
FIG. 8 is block diagram showing the construction of a line interface (the construction of a MULTI-LINE/CARD)

FIG. 8 is a diagram showing the line interface of MULTI-LINE/CARD construction. This line interface includes line accommodating units $21_1 \sim 21_4$ for converting frame signals, which have entered from corresponding incoming lines $IN_1 \sim IN_4$ and have a prescribed format, to cell streams, outputting these cell streams, converting cell streams that have entered from the ATM switch side to frame signals having the above-mentioned format and sending these frame signals to corresponding outgoing lines $OUT_1 \sim OUT_4$; the first cell address converter (cell address degenerating converter) 22 for converting a VPI/VCI included in the header of a cell to a cell address ICID (Internal Channel Identifier) having a number of bits smaller than the number of bits of the VPI/VCI; the second cell address converter (cell address expanding converter) 23 for converting a cell address, which is included in the header of a cell that enters from the ATM switch side, to a VPI/VCI; the processor 24 for performing UPC (Usage Parameter Control), billing control and other processing based upon a cell address; a time-division multiplexer 25 time-division multiplexing cells output by the line interfaces $21_1 \sim 21_4$ and entering the cells into the cell address degenerating converter 22; and a demultiplexer 26 for demultiplexing, on a per-line basis, cells output by the cell address converter 23, and entering the cells into the prescribed line interfaces $21_1 \sim 21_4$.

The line interface having the MULTI-LINE/CARD construction time-division multiplexes cells that enter from four lines and enters the time-division multiplexed 600 Mbps cell stream into four multiplexer/demultiplexers $12_1 \sim 12_4$, which constitute the next stage.

(D) Multiplexer/Demultiplexer

Figure 9:
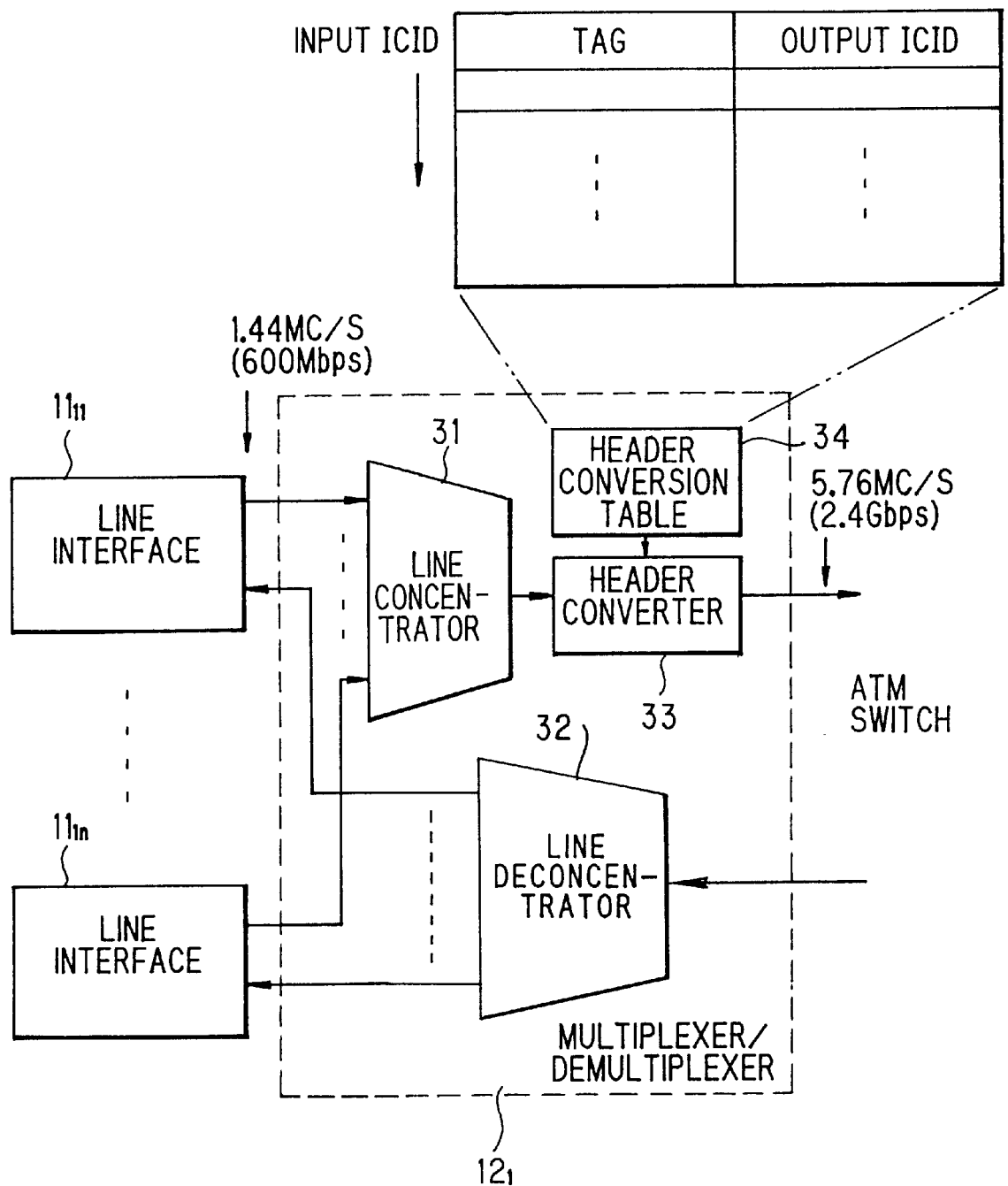
FIG. 9 is a diagram showing the construction of a multiplexer/demultiplexer.

FIG. 9 is a diagram showing the construction of the multiplexer/demultiplexer $12_1$. The other multiplexer/demultiplexers $12_2 \sim 12_4$ are similarly constructed. The multiplexer/demultiplexer $12_1$ includes the line concentrator 31 for concentrating cell streams output by each of the plurality of line interfaces $11_{11} \sim 11_{1n}$ and entering the resulting signal into the ATM switch unit 13, the line deconcentrator 32 for deconcentrating cells, which have been switched by the ATM switch unit 13, on a per line interface basis, and entering the resulting signals into the line interfaces $11_{11} \sim 11_{1n}$, a header converter 33 for adding a routing tag TAG onto the header of an input cell and replacing the cell address ICID (input ICID) included in the header by another ICID (output ICID), and a header conversion table 34 for storing the tags TAG and output ICIDs in correspondence with the input ICIDs. The tags TAG and output ICIDs are registered in the header conversion table 34 by well-known call processing control, which is performed by the system controller 14 (FIG. 2), in correspondence with input ICIDs conforming to calls.

On the assumption that the line interfaces $11_{11} \sim 11_{1n}$ are of the MULTI-LINE/CARD construction for accommodating the four lines of line rate 156 Mbps, the speed of the cell stream sent from each line interface will be about 1.44 Mcell/sec (which corresponds to about 600 Mbps). A 1.44

Mcell/sec (cell/sec will be abbreviated to "C/S" below) highway connects each of the line interfaces $11_{11}$~$11_{1n}$ and the multiplexer/demultiplexer $12_1$, and a 5.76 MC/S (about 2.5 Gbps) highway connects the multiplexer/demultiplexer $12_1$ and the ATM switch unit 13. Accordingly, the arrangement possesses a line concentrator function conforming to the number of highways of the line interfaces that enter the multiplexer/demultiplexer $12_1$.

The line concentrator 31 concentrates and outputs cell streams output by each of the plurality of line interfaces $11_{11}$~$11_{1n}$, and the header converter 33 adds a tag onto the input cell by referring to the header conversion table 34, replaces the input ICID with the output ICID and then enters the cell into the ATM switch unit 13, which is the next stage. The line deconcentrator 32 deconcentrates cells, which have been switched by the ATM switch unit 13, on a per line interface basis by referring to the tags that have been added onto the cells, and enters the resulting signals into the line interfaces $11_{11}$~$11_{1n}$.

(a) Line Concentrator

The line concentrator 31 can be constructed as a batch concentrator and divided concentrator.

Batch Concentrator Construction

FIG. 10 is a diagram showing the line concentrator 31 having the batch concentrator construction. This is for a case where cells output by 16 line interfaces are transmitted upon being concentrated. The line concentrator 31 includes the time-division multiplexer 31a, the output speed of which is 23.04 MC/S (9.6 Gbps), for time-division multiplexing of cells output by the 16 line interfaces, the cell buffer (e.g., a FIFO memory) 31b for storing cells output by the time-division multiplexer 31a, and the concentration management unit 31c for controlling writing of cells to the cell buffer and reading of cells from the cell buffer. The concentration management unit 31c writes cells to the cell buffer 31b at a speed of 23.04 MC/S (9.6 Gbps) and reads cells from the cell buffer 31b at a speed of 5.76 MC/S (2.4 Gbps).

If it is assumed that cells are present in each of the time slots of the cell stream delivered by the time-division multiplexer 31a, the cell buffer 31b will soon fill up and discarding of cells will occur because cells are written to the cell buffer 31b at 23.04 MC/S (9.6 Gbps) and read out of the cell buffer 31 at 5.76 MC/S (2.4 Gbps). However, cells are not sent from each of the line interfaces $11_{11}$~$11_{1n}$ at all times, meaning that vacant time slots occur. In other words, cells output by the 16 line interfaces can be concentrated and fed into the ATM switch unit 13 without cells being discarded.

The foregoing relates to a case where the line interfaces are constituted by a MULTI-LINE/CARD accommodating four lines (see FIG. 8). In case of a line interface of LINE/CARD construction accommodating only a single line (see FIG. 3), 64 line interfaces are connected to the time-division multiplexer 31a to perform concentration.

Divided Concentrator Construction

FIG. 11 is a diagram showing the line concentrator 31 having the divided concentrator construction. This is for a case where cells output by n (=16) line interfaces are transmitted upon being concentrated. The line concentrator 31 includes the plurality of time-division multiplexers $31a_1$~$31a_4$, the output speed of which is 5.7 MC/S (2.4 Gbps), each of which is for time-division multiplexing of cells output by four line interfaces; the plurality of cell buffers $31b_1$~$31b_4$ for storing cells output by respective ones of the corresponding time-division multiplexers $31a_1$~$31a_4$; the concentrator management unit 31d for writing cells output by each of the time-division multiplexers to the corresponding cell buffers and storing the identification numbers of cell buffers, in which cells have been written, in the order in which the cells were written; and the selector 31e for reading and outputting cells, at the speed of 5.76 MC/S (2.4 Gbps), from each of the cell buffers in accordance with the order in which cells where written in the cell buffers managed by the concentrator management unit.

The line concentrator of FIG. 11 corresponds to the case (see FIG. 8) where the line interfaces are of the MULTI-LINE/CARD construction accommodating four lines. In a case where the line interfaces are of the LINE/CARD construction (see FIG. 3) accommodating only a single line, 16 line interfaces are connected to each of the time-division multiplexers $31_{a1}$~$31_{a4}$ to perform concentration.

In accordance with the batch concentrator arrangement of FIG. 10, the cell buffer 31b is of great length and the speed at which data are written to the cell buffer 31b is required to be the high speed of 23.04 MC/S (9.6 Gbps). However, concentration can be performed at a stroke and the architecture is a simple one. With the divided concentrator arrangement of FIG. 11, on the other hand, the architecture is complicated but the cell buffer can be shortened and the speed at which data are written to the cell buffers can be held to a low 5.76 MC/S (2.4 Gbps).

(b) Line Deconcentrator

FIG. 12 is a diagram showing the construction of the line deconcentrator 32 in a case where the line interfaces are of the MULTI-LINE/CARD construction accommodating four lines. This is for a case where cells are demultiplexed and output for each of 16 line interfaces. The line deconcentrator 32 includes the cell buffer 32a for storing cells that have entered from the ATM switch unit 13 at the speed of 5.76 MC/S (2.4 Gbps), the address managing FIFOs $32_{b0}$~$32b_{15}$ provided to correspond to outgoing lines for storing the addresses of cell buffer 32a in which cells have been stored, and the write controller 32c for storing cells at vacant addresses of the cell buffer and storing the address data in the address managing FIFOs $32_{b0}$~$32b_{15}$ corresponding to the line interfaces that are the destinations of the above-mentioned cells. The line interfaces that are the destinations of the cells can be discriminated by referring to the tags that have been added onto the cells. The line deconcentrator 32 further includes the read controller 32d for performing scanning cyclically to determine whether address data have been stored in each of the address managing FIFOs $32_{b0}$~$32b_{15}$, and, if address data have been stored in a prescribed address managing FIFO, reading a cell from a storage area of the cell buffer 32a designated by these address data and entering the cell into the line interface that corresponds to this address managing FIFO. The read controller 32d reads cells out of the cell buffer and enters them into each of the line interfaces at a speed of 23.04 MC/S (9.6 Gbps). The line deconcentrator 32 further includes a vacant-address managing FIFO 32e for managing vacant addresses in the cell buffer 32a. Whenever the read controller 32d reads a cell out of the cell buffer 32a, the controller 32d stores the address at which this cell was stored in the vacant-address management FIFO 32e as a vacant address. Further, the write controller 32c refers to the vacant-address management FIFO 32e, recognizes the vacant address and writes the cell at this address.

Figure 13A:
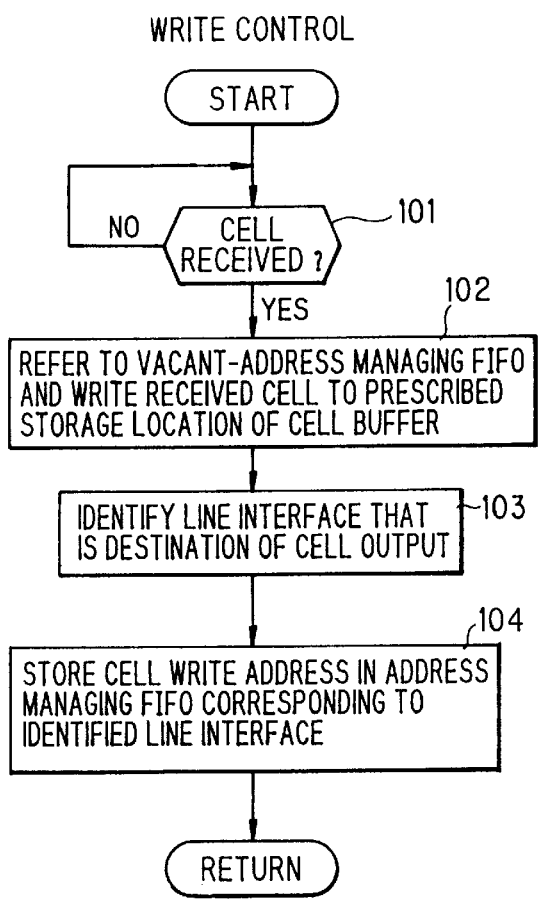
FIGS. 13A, 13B are flowcharts of processing for controlling read/write in the deconcentrator.

FIG. 13 is a flowchart of processing for write control and read control.

If the write controller 32c receives a cell from the ATM switch unit 13 (step 101), the controller 32c refers to the vacant-address managing FIFO 32e and writes the received cell to the prescribed storage location of the cell buffer 32a (step 102). Next, the write controller 32c refers to the tag TAG that has been added onto the header of the received cell and identifies the line interface that is the destination of this cell (step 103). Next, the write controller 32c stores the address of the storage area to which the cell was written in the address managing FIFO that corresponds to the cell-destination line interface and then ends write processing (step 104). The program then returns to the beginning.

The read controller 32d cyclically scans the address managing FIFOs $32_{b0}$~$32b_{15}$ in a predetermined order and determines whether address data have been written in the address managing FIFOs (steps 111, 112). If data have been written to a prescribed address managing FIFO, the read controller 32d reads the cell out of the cell buffer 32a from the location designated by these address data and sends the cell to the line interface corresponding to the above-mentioned address managing FIFO (step 113). Next, the read controller 32d stores the address of the storage location from which the cell was read out in the vacant-address management FIFO 32e as a vacant address (step 114). The program then returns to the beginning and the above processing is repeated. As a result, the cell stream that has entered from the ATM switch unit 13 at the speed of 5.76 MC/S (2.4 Gbps) is deconcentrated in the deconcentrator 32 to cell streams having a maximum speed of 1.44 MC/S (600 Mbps) and the cell streams enter the line interfaces of MULTI-LINE/CARD construction accommodating four lines.

The foregoing is a deconcentrator of MULTI-LINE/CARD construction accommodating four line interfaces. In a case where the line interface is of LINE/CARD construction accommodating only a single line, the deconcentrator will be as shown in FIG. 14. Elements in the deconcentrator of FIG. 14 identical with those of the deconcentrator in FIG. 12 are designated by line reference characters. The arrangement of FIG. 14 differs from that of FIG. 12 in that 64 address managing FIFOs $32b_0$~$32b_{63}$ in correspondence with the output lines (line interfaces).

More specifically, the deconcentrator of FIG. 14 has (1) the cell buffer 32a for storing cells that have entered from the ATM switch unit 13; (2) the address managing FIFOs $32_{b0}$~$32b_{63}$ provided to correspond to output lines (line interfaces) for storing the addresses of the cell buffer in which cells have been stored; (3) the write controller 32c for storing cells at vacant addresses of the cell buffer and storing the address data in the address managing FIFOs $32_{b0}$~$32b_{63}$ corresponding to the output lines to which the abovementioned cells are sent; (4) the read controller 32d for performing scanning cyclically to determine whether address data have been stored in each of the address managing FIFOs $32_{b0}$~$32b_{63}$, and, if address data have been stored in a prescribed address managing FIFO, reading a cell from a storage area of the cell buffer 32a designated by these address data and entering the cell into the line interface to which the output line that corresponds to this address managing FIFO has been connected; and (5) the vacant-address management FIFO 32e for managing the vacant address in the cell buffer 32a.

(E) Cell Deconcentration

Cell deconcentration for deconcentrating cells (incoming cells) from the ATM switch unit 13 and sending the cells to the lines includes divided deconcentration and batch deconcentration.

(a) Divided Deconcentration

In divided deconcentration, incoming cells are deconcentrated from a 5.76 MC/S highway to n-number (n=16) of 1.44 MC/S highways by the deconcentrator 32, then the 1.44 MC/S cell streams are separated into frame data of a line rate of 150 Mbps by the line interfaces. Accordingly, in order to employ divided deconcentration, the line interfaces must be of the MULTI-LINE/CARD construction accommodating a plurality of lines.

Figure 15:
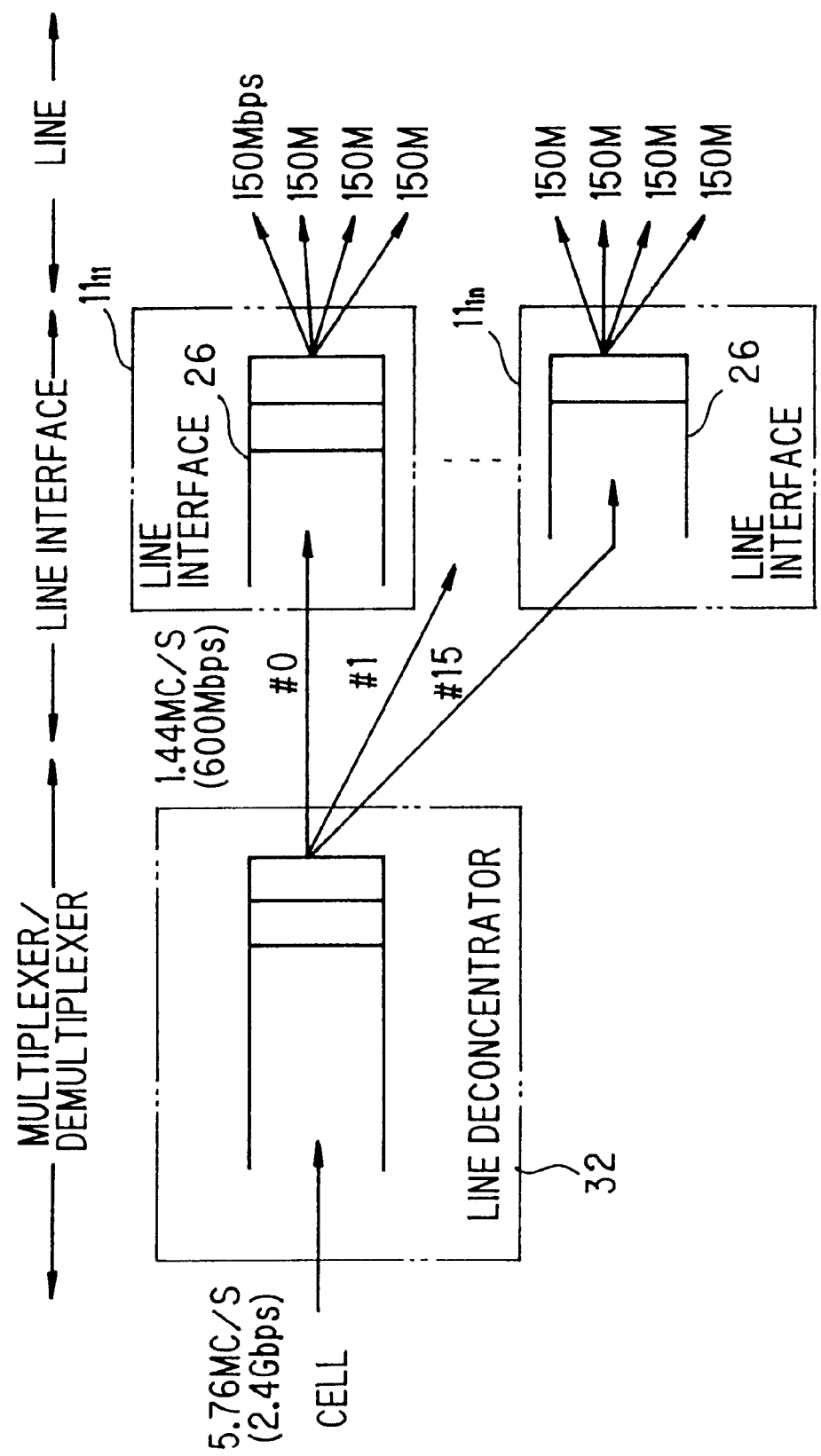
FIG. 15 is a diagram for describing divided deconcentration.

FIG. 15 is a diagram for describing divided deconcentration. Shown in FIG. 15 are the deconcentrator 32 having the construction shown in FIG. 12, the line interfaces $11_{11}$~$11_{1n}$ (n=16) having the construction shown in FIG. 8 for accommodating four lines, and the demultiplexers 26 provided in the corresponding line interfaces $11_{11}$~$11_{1n}$.

Figure 16:
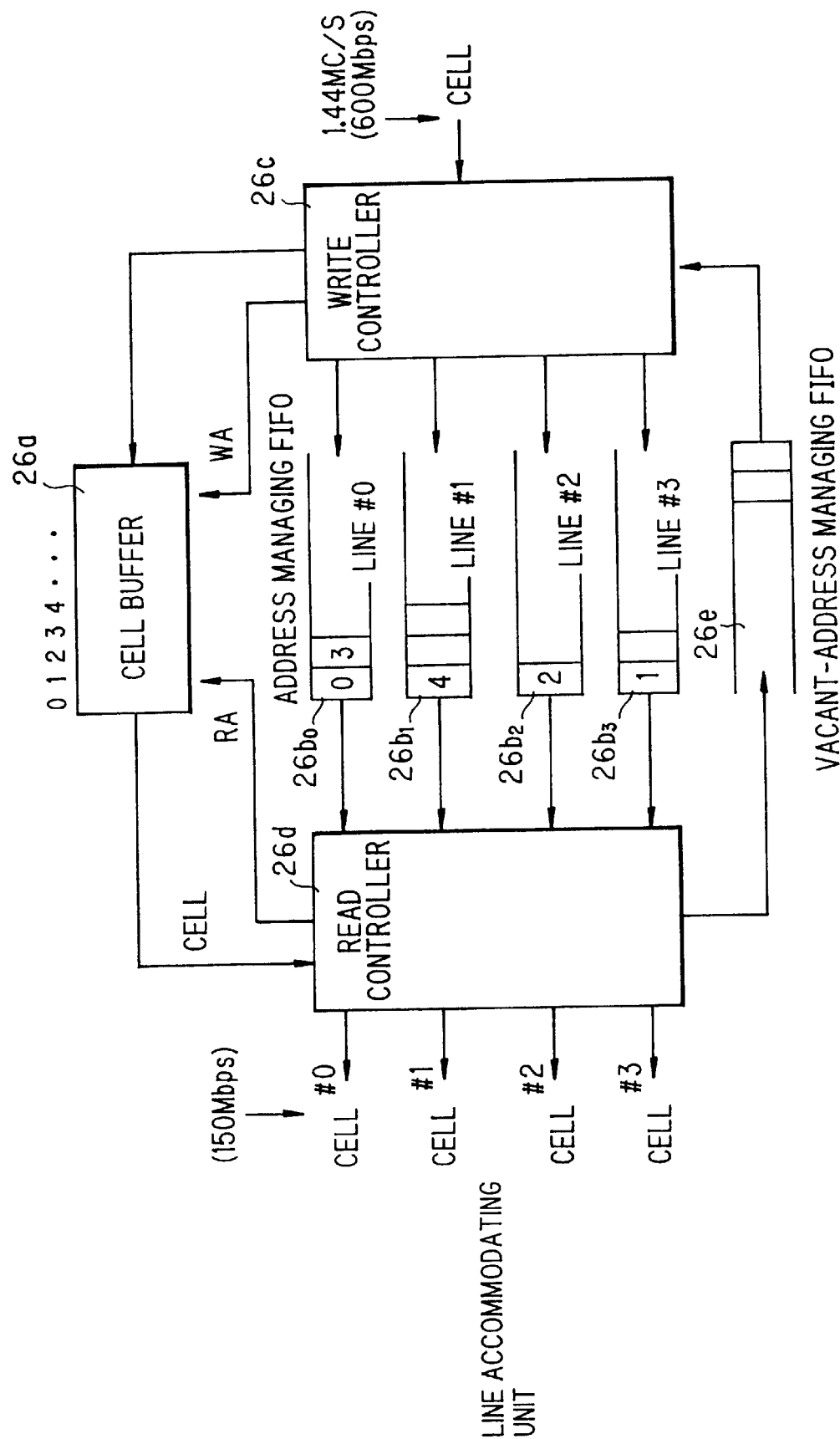
FIG. 16 is a diagram showing the construction of a demultiplexer in a line interface in a case where divided deconcentration is employed.

The demultiplexer 26 has a construction the same as that of the deconcentrator shown in FIG. 12. FIG. 16 is a diagram showing the construction of the demultiplexer 26 and illustrating a case where cells are demultiplexed on a four-line basis and entered into the line accommodating units $21_1$~$21_4$. The demultiplexer 26 includes a cell buffer 26a for storing cells that have entered from the deconcentrator 32 at the speed of 1.44 MC/S (600 Mbps), address managing FIFOs $26_{b0}$~$26b_3$ provided to correspond to each of the lines for storing the addresses of the cell buffer 26a in which cells have been stored, and a write controller 26c for storing cells at vacant addresses of the cell buffer 26a and storing the address data in the address managing FIFOs $26_{b0}$~$26b_3$ corresponding to the lines to which the above-mentioned cells are sent. The lines that are the destinations of the cells can be discriminated by referring to the tags that have been added onto the cells.

The demultiplexer 26 further includes a read controller 26d for performing scanning cyclically to determine whether address data have been stored in each of the address managing FIFOs $26_{b0}$~$26b_3$, and, if address data have been stored in a prescribed address managing FIFO, reading a cell from a storage area of the cell buffer 26a designated by these address data and entering the cell into the line accommodating unit that corresponds to this address managing FIFO. The read controller 26d reads cells out of the cell buffer and enters them into the line accommodating units at the speed of 1.44 MC/S (600 Mbps). The demultiplexer 26 further includes a vacant-address managing FIFO 26e for managing vacant addresses in the cell buffer 26a. Whenever the read controller 26d reads a cell out of the cell buffer 32a, the controller 26d stores the address at which this cell was stored in the vacant-address management FIFO 26e as a vacant address. The write controller 26c recognizes a vacant address by referring to the vacant-address management FIFO 26e and writes a cell at this address.

The line deconcentrator 32 deconcentrates a 5.76 M/S (2.4 Gbps) cell stream to 1.44 MC/S (600 Mbps) cell streams for respective ones of the 16 line interfaces $11_{11}$~$11_{1n}$ of MULTI-LINE/CARD construction, and the demultiplexers 26 of the respective line interfaces $11_{11}$~$11_{1n}$ demultiplex the 1.44 MC/S (600 Mbps) cell streams from the deconcentrator 32 to 150 Mbps cell streams for respective ones of the four lines. Each resulting cell stream is sent to a line via a line interface.

(b) Batch Deconcentration

Batch Deconcentration in Case where Line Interface is Constituted by LINE/CARD

Figure 17:
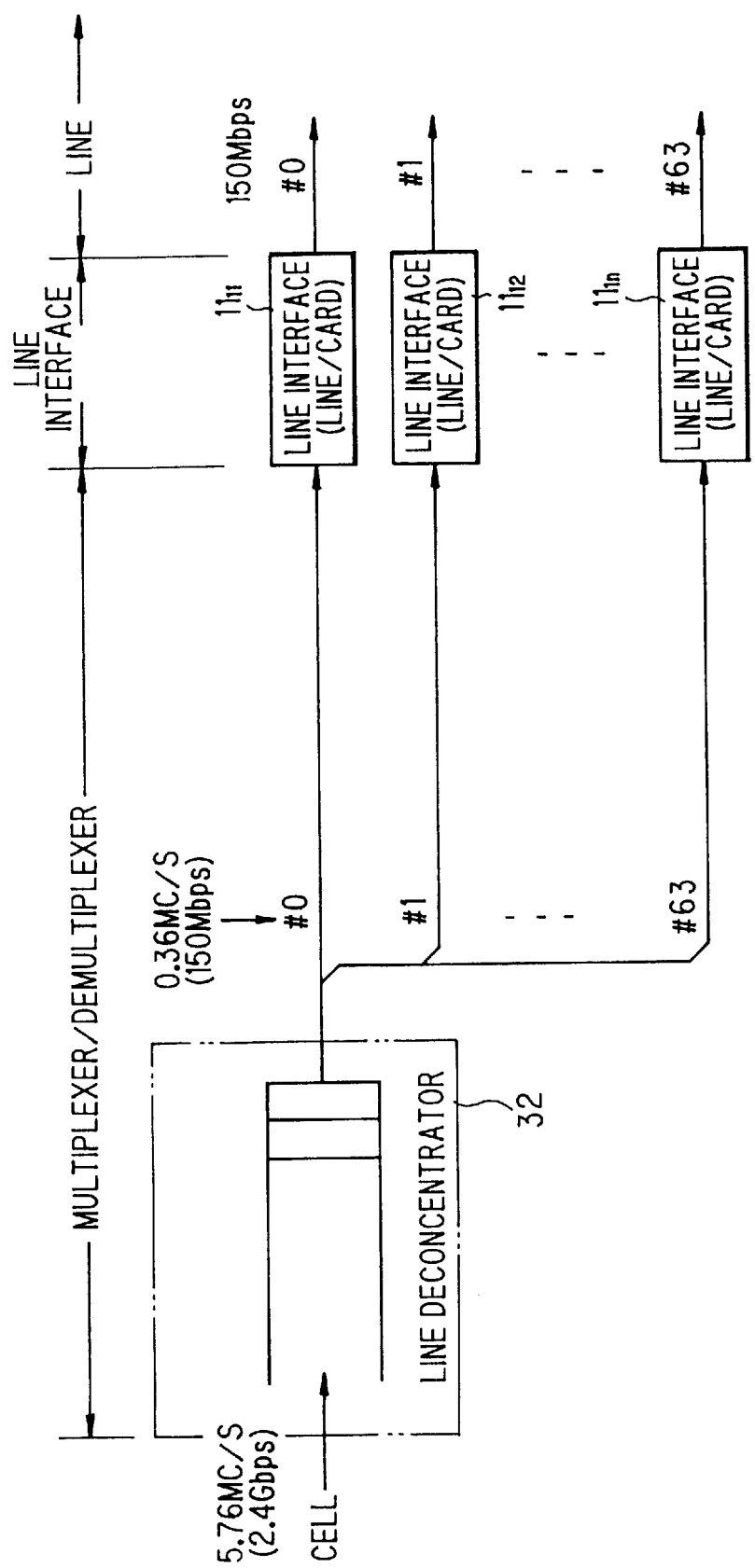
FIG. 17 is a diagram for describing batch deconcentration in a case where a line interface is formed by a LINE/CARD.

FIG. 17 is a diagram for describing batch deconcentration in a case where line interfaces are constituted by LINE/CARDs. Shown in FIG. 17 are the line deconcentrator 32 having the construction illustrated in FIG. 14, and the line interfaces $11_{11}$~$11_{1n}$ (n=64) having the LINE/CARD construction (see FIG. 3).

In batch deconcentration when line interfaces are of the LINE/CARD construction, a 5.76 MC/S incoming cell stream is deconcentrated at a stroke in the line deconcentrator 32 to cell streams for 64 lines of the line rate (=150 Mbps), the cell streams enter the line interfaces $11_{11}$~$11_{1n}$, the line interfaces $11_{11}$~$11_{1n}$ convert the input cells to frame signals having the STS-3C format and the frame signals enter the lines.

Figure 18:
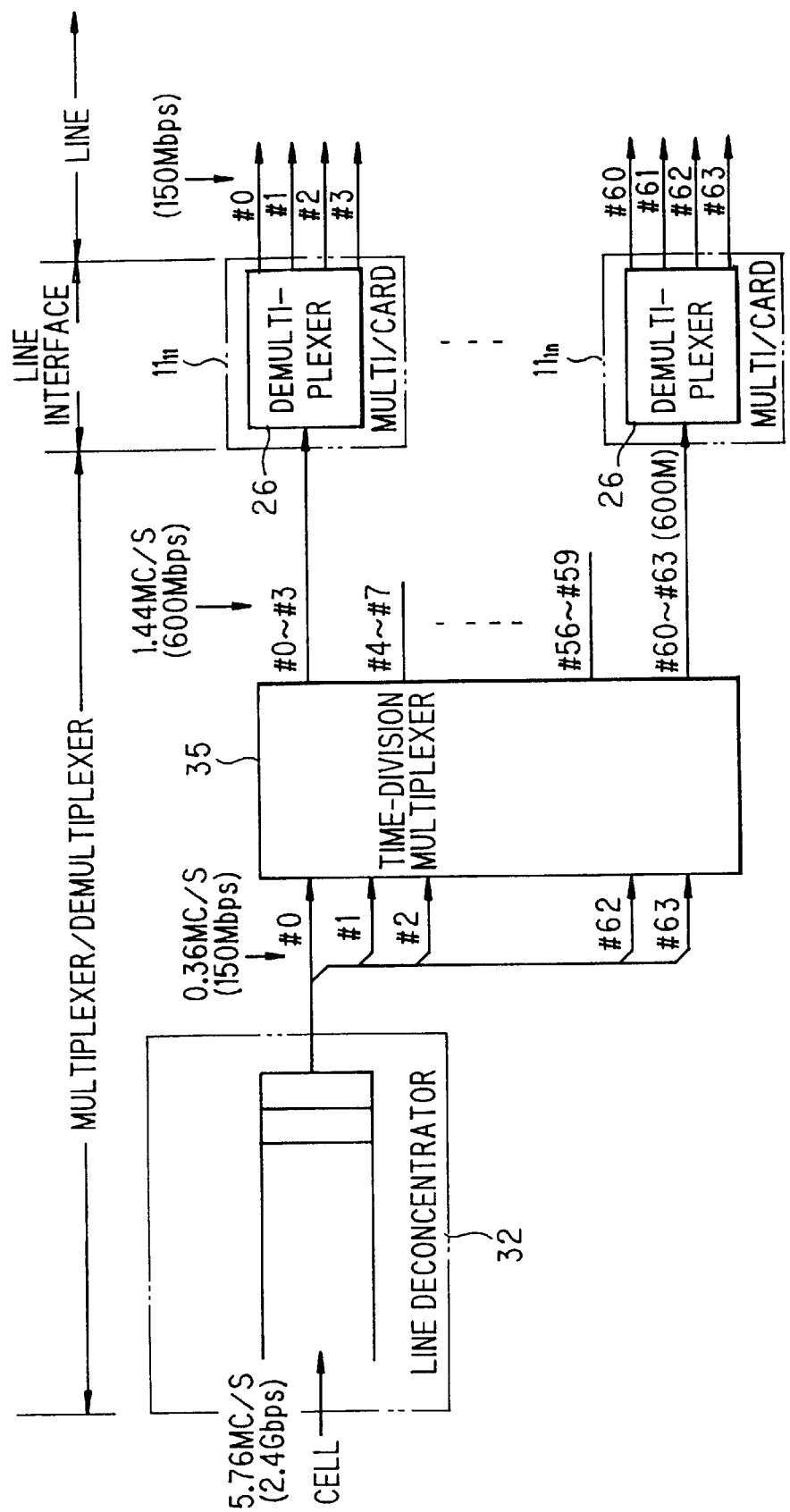
FIG. 18 is a diagram for describing batch deconcentration in a case where a line interface is formed by a MULTI-LINE/CARD.

Batch Deconcentration in Case where Line Interface is Constituted by MULTI-LINE/CARD FI G. 18 is a diagram for describing batch deconcentration in a case where line interfaces are constituted by MULTI-LINE/CARDs. Shown in FIG. 18 are the line deconcentrator 32 having the construction illustrated in FIG. 14, a time-division multiplexer 35 for time-division multiplexing cells sent to lines #0~#3, #4~#7, . . . , #60~#63, and line interfaces $11_{11}$~$11_{1n}$ each of MULTI-LINE/CARD construction accommodating four lines (see FIG. 8). The line interfaces $11_{11}$~$11_{1n}$, each of which has the demultiplexer 26, demultiplex and distribute the cell streams, which have been time-division multiplexed by the time-division multiplexer 35, to the lines in sequential fashion in the order of the time slots.

In accordance with batch deconcentration in case of line interfaces constituted by MULTI-LINE CARDs, the line deconcentrator 32 deconcentrates a 5.76 M/S incoming cell stream to cell streams of 64 lines of the line rate (=150 Mbps) and enters the cell streams into the time-division multiplexer 35. The time-division multiplexer 35 time-division multiplexes the cells sent to the respective lines #0~#3, #4~#7, . . . , #60~#63 and enters these into the line interfaces $11_{11}$~$11_{1n}$ as 1.44 MC/S (600 Mbps) cell streams. The demultiplexers 26 in the respective line interfaces $11_{11}$~$11_{1n}$ demultiplex the time-division multiplexed cell streams in sequential fashion in the order of the time slots and enter the cell streams into the line accommodating units (not shown). The line accommodating units make the input cells STS-3C frame signals and send the frame signals to the corresponding lines.

In general, since batch deconcentration is such that the cell stream of a high-speed highway is deconcentrated at a stroke to cell streams of low-speed highways, performance is excellent. However, when a burst data communication service typified by TCP/IP is considered, the cell buffer in the line deconcentrator 32 would be of great length, the required length being in excess of several tens of thousands of cells. Acquiring such an enormous cell length in a high-speed section having a speed of 5.76 MC/S would be difficult.

By contrast, divided deconcentration exhibits lower performance but the buffer length of the line deconcentrator 32 need only be equivalent to several thousand cells. Such an arrangement is easier to realize than the batch demultiplexing arrangement and is lower in cost.

(F) Cell Concentration Control and Cell Deconcentration Control Accompanying Duplexing of Line Interfaces A scenario will be considered in which the line interfaces in an ATM switching system are duplexed in such a manner that service can be continued even if failure develops. In such case it is required that the line concentrator 31 (see FIG. 1) concentrate, and enter into the ATM switch unit 13, only cells output by the line interfaces that are active. In a case where an active/standby changeover is performed dynamically, cell duplication and cell loss must not accompany the changeover. On the other hand, when the line deconcentrator 32 deconcentrates cells, which are output by the ATM switch unit 13, on a per line interface basis and sends the cells to each of the line interfaces, it is required that the line deconcentrator 32 copy the cells and send the copies to the standby line interfaces as well.

(a) Line Concentrator

Figure 19:
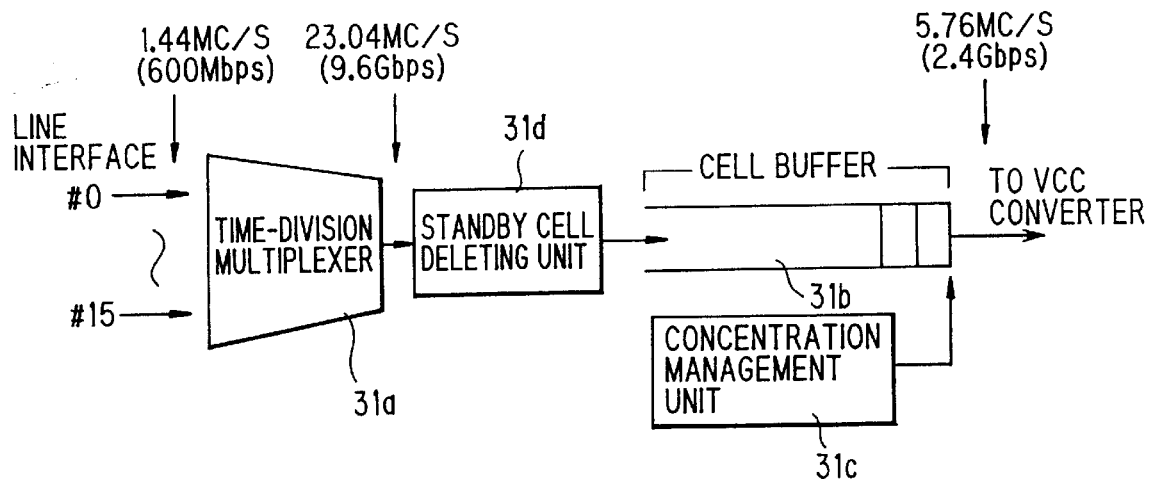
FIG. 19 is a diagram illustrating the construction of a batch concentrator in a case where duplexed line interfaces exist.

FIG. 19 is a diagram showing the construction of the line concentrator 31 in an ATM switching system in which prescribed line interfaces are placed in an active system and other line interfaces in a standby system. The line concentrator 31 has the construction of a batch concentrator in which elements identical with those shown in FIG. 10 are designated by like reference characters. The line concentrator 31 comprises the time-division multiplexer 31a for time-division multiplexing of cells output by 16 line interfaces, the output speed being 23.04 MC/S (9.6 Gbps). Data (active/standby system identification data) for identifying whether a cell is an active-system cell or a standby-system cell have been added onto the header of the cell that enters from each line interface of MULTI-LINE/CARD construction. For example, if these data are represented by two bits, the cell will be an active cell if "01" holds, a standby cell if "10" holds and a cell from a non-duplexed line interface if "00" holds. The active/standby system identification data is added on by the data add-on unit 25 (see FIGS. 1 and 5) provided on the output side of the first cell address degenerating converter 22 in the line interface.

The line concentrator 31 further includes a standby-cell deleting unit 31d which, upon referring to the active/standby system identification data contained in the header of an input cell, discards standby cells and outputs other cells, the cell buffer (e.g. FIFO memory) 31b for storing cells output by the standby-cell deleting unit 31d, and the concentration management unit 31c for controlling writing of cells to the cell buffer and readout of cells from the cell buffer. The concentration management unit 31c writes cells to the cell buffer 31b at a speed of 23.04 MC/S (9.6 Gbps) and reads cells out of the cell buffer 31b at a speed of 5.76 MC/S (2.4 Gbps).

Figure 20:
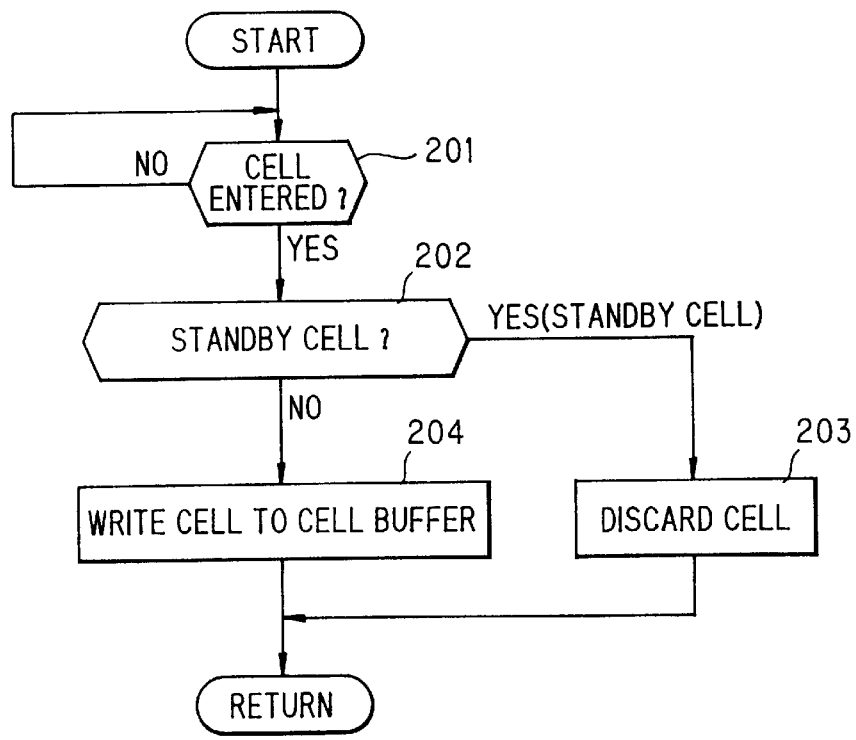
FIG. 20 is a flowchart of processing executed by a standby-cell deleting unit.
Figure 23A:
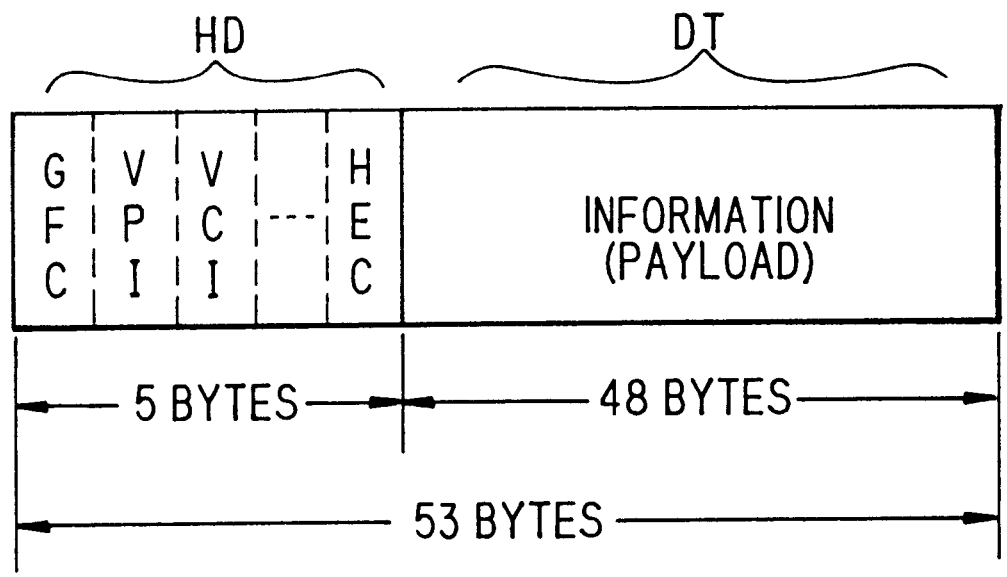
FIGS. 23A, 23B are diagrams shown the structures of ATM cells.
Figure 23B:
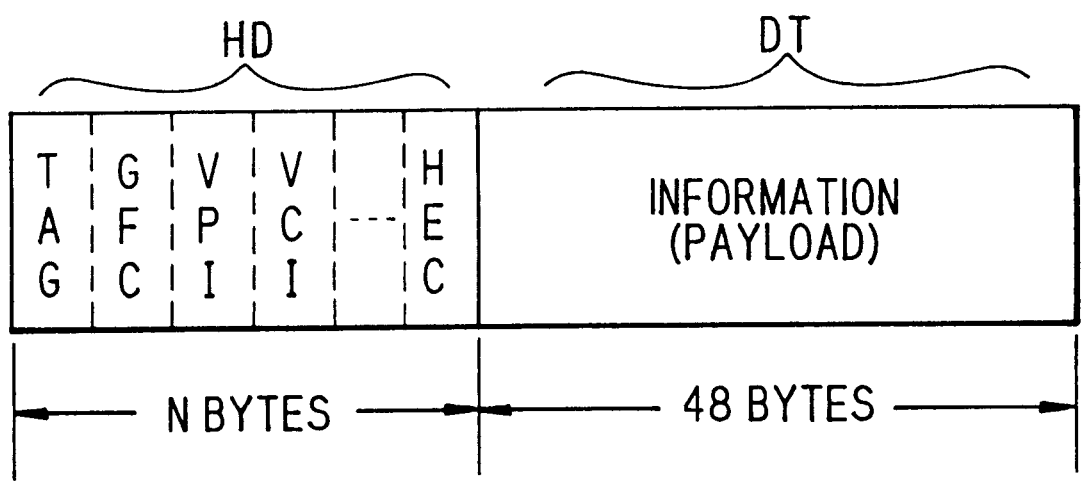
Figure 24:
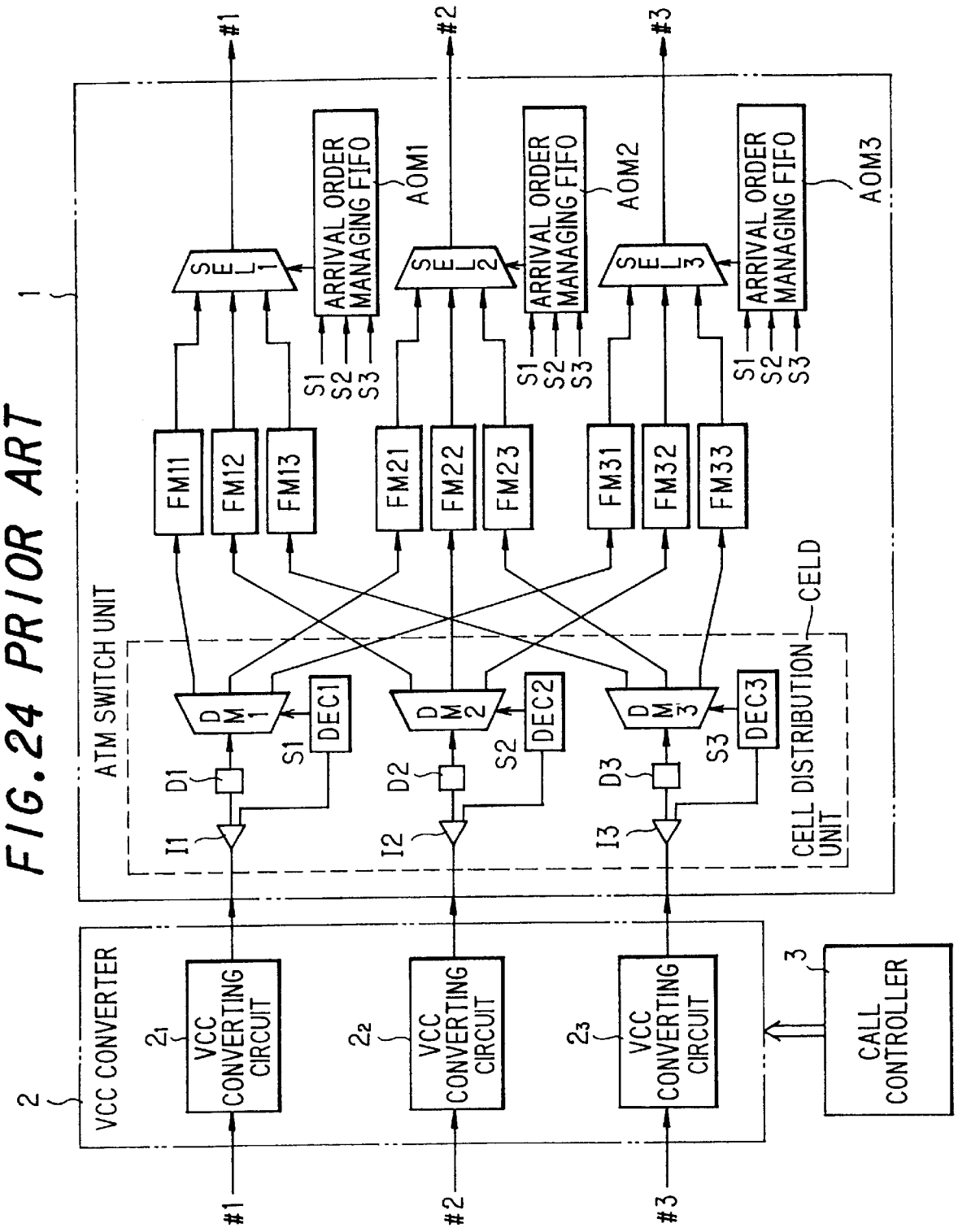
FIG. 24 is a diagram for describing an ATM switch.

FIG. 20 is a flowchart of processing executed by the standby-cell deleting unit 31d.

When a cell enters (step 201), the standby-cell deleting unit 31d refers to the active/standby system identification data to determine whether the cell is a standby cell (step 202). The standby-cell deleting unit 31d discards the cell (step 203) if it is a standby cell and writes the cell to the cell buffer 31b (step 204) if it is not a standby cell.

As a result of the foregoing operation, only cells other than standby cells (i.e. only active cells) can be concentrated and entered into the ATM switch unit 13.

(b) Line Deconcentrator

FIG. 21 is a diagram showing the construction of the line deconcentrator 32 in an ATM switching system in which prescribed line interfaces are placed in an active system and other line interfaces in a standby system. Elements identical with those shown in FIG. 12 are designated by like reference characters. This arrangement differs from that of FIG. 12 in that when a cell is sent to an active line interface, the cell can be copied and sent to a standby line interface as well. It should be noted that information such an information indicating whether each line interface is active, standby or not duplexed is input to the write controller 32c.

FIG. 22 is a flowchart of write processing executed by the write controller 32c.

If the write controller 32c receives a cell from the ATM switch unit 13 (step 301), the controller 32c refers to the vacant-address managing FIFO 32e and writes the received cell to the prescribed storage location of the cell buffer 32a (step 302). Next, the write controller 32c refers to the tag TAG that has been added onto the header of the received cell and identifies the line interface that is the destination of this cell (step 303). The write controller 32c then checks to determine whether the line interface that is the destination of this cell is active or standby (step 304). If the line interface that is the destination of this cell is not active, i.e. if the line interface has not been duplexed, the write controller 32*c* stores the address of the storage area to which the cell was written in the address managing FIFO that corresponds to the above-mentioned line interface and then ends write processing (step 305). The program then returns to the beginning.

On the other hand, if the line interface that is the destination of this cell is active, the write controller 32*c* obtains the standby line interface, stores the address of the storage area to which the cell was written in the two address managing FIFOs that correspond to both the active and standby line interfaces and then ends write processing (step 306). The program then returns to the beginning.

Figure 13B:
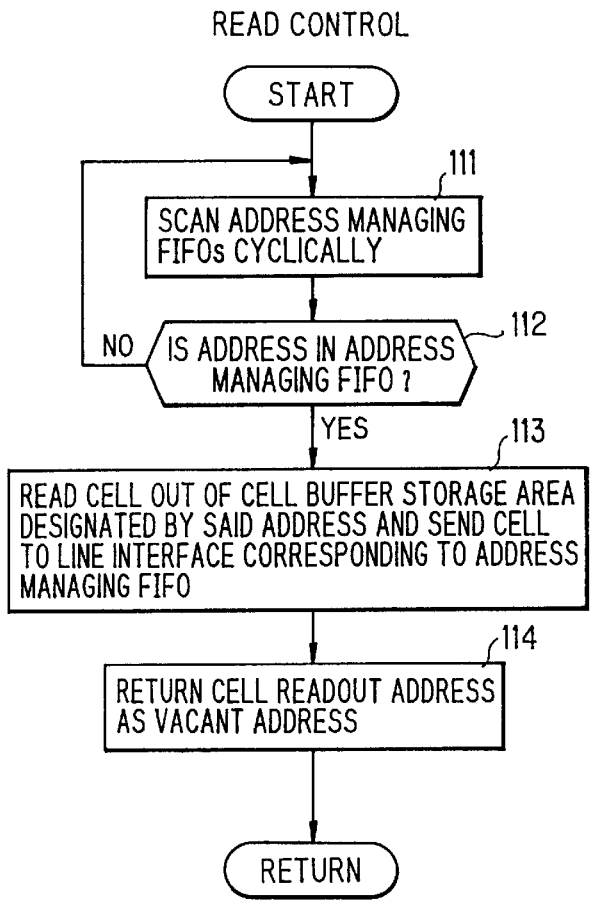

The read controller 32*d* reads out cells in accordance with the processing flowchart shown in FIG. 13B. That is, the read controller 32*d* cyclically scans the address managing FIFOs $32_{b0}$~$32_{b15}$ in a predetermined order and determines whether address data have been written in the address managing FIFOs. If data have been written to a prescribed address managing FIFO, the read controller 32*d* reads the cell out of the cell buffer 32*a* from the location designated by these address data and sends the cell to the line interface corresponding to the above-mentioned address managing FIFO. Next, the read controller 32*d* stores the address of the storage location from which the cell was read out in the vacant-address management FIFO 32*e* as a vacant address. The program then returns to the beginning and the above processing is repeated. As a result, identical cells enter the active and standby line interfaces.

In accordance with the present invention, a line interface such as a subscriber interface is adapted to convert a VPI/VCI value included in the header of a cell to a cell address having a number of bits smaller than the number of bits of the VPI/VCI value, and to convert a cell address, which is included in the header of a cell that enters from the side of ATM switch, to a VPI/VCI value. As a result, an ATM switching system is capable of controlling the management of various data as well as the switching of cells based upon cell addresses. This makes it possible to reduce the scale of various tables and processing circuits and to make effective utilization of resources in an ATM switching system.

In accordance with the present invention, a line interface such as a subscriber interface is adapted to add active/standby identification data, which indicates whether its own line interface is active or standing by, onto a cell header. As a result, a line concentrator is capable of identifying a cell that has entered from a line interface is an active cell or a standby cell, discarding standby cells, concentrating only cells from which standby cells have been deleted and entering these cells into the ATM switch. Further, a line deconcentrator is adapted to determine whether a line interface that is the destination of a cell that has entered from the ATM switch has been duplexed or not (i.e., whether this line interface is active or not), and to enter the cell into both active and standby line interfaces if the destination line interface is active. As a result, cell concentration and deconcentration can be controlled in simple fashion even if both active and standby line interfaces exist.

In accordance with the present invention, the line concentrator comprises (1) a time-division multiplexer for time-division multiplexing cells output by a plurality of line interfaces, (2) a cell buffer for storing cells output by the time-division multiplexer, and (3) means for reading cells out of the cell buffer at a prescribed speed and entering the cells into the ATM switch. As a result, cells can be batch concentrated and then entered into the ATM switch. Further, the line concentrator comprises (1) a plurality of time-division multiplexers for time-division multiplexing cells output by a plurality of line interfaces, (2) a plurality of cell buffers for storing cells output by each of the time-division multiplexers, (3) a management unit for managing, in order of storage, the sequence of cell buffers in which cells are stored, and (4) means for reading cells out of the cell buffers at a prescribed speed and in the above-mentioned order of storage, and entering the cells into the ATM switch. As a result, cells can be subjected to divided concentration and then entered into the ATM switch. Accordingly, a desired ATM switching system architecture can be obtained using a batch or divided concentrating-type line concentrator.

In accordance with the present invention, a cell deconcentrator comprises (1) a cell buffer for storing cells that have entered from an ATM switch, (2) an address managing FIFO, provided in correspondence with each line, for storing an address of the cell buffer in which a cell has been stored, (3) a write controller for storing a cell at a prescribed address of the cell buffer and storing the address data in an address managing FIFO corresponding to a line to which the above-mentioned cell is sent, and (4) a read controller for performing scanning cyclically to determine whether address data have been stored in each address managing FIFO, and, if address data have been stored in a prescribed address managing FIFO, reading a cell from a storage area of the cell buffer designated by these address data and entering the cell into a line interface to which the line corresponding to this address managing FIFO is connected. As a result, using this deconcentrator makes it possible for a cell stream from the ATM switch to be deconcentrated collectively to cells of the line operating rate. This is referred to as batch cell deconcentration.

In accordance with the present invention, a cell deconcentrator of a multiplexer/demultiplexer comprises (1) a cell buffer for storing cells that have entered from an ATM switch, (2) an address managing FIFO, provided in correspondence with each line interface, for storing an address of the cell buffer in which a cell has been stored, (3) a write controller for storing a cell at a prescribed address of the cell buffer and storing the address data in an address managing FIFO corresponding to a line interface to which the above-mentioned cell is sent, and (4) a read controller for performing scanning cyclically to determine whether address data have been stored in each address managing FIFO, and, if address data have been stored in a prescribed address managing FIFO, reading a cell from a storage area of the cell buffer designated by these address data and entering the cell into a line interface corresponding to this address managing FIFO. As a result, using this line deconcentrator makes it possible for a cell stream that has entered from the ATM switch to be deconcentrated to a plurality of cell streams of highway speed, after which each cell stream can be separated into cells of the line operating rate by the line interface. This is referred to as divided cell deconcentration.

Further, a desired ATM switching system architecture can be obtained employing batch cell deconcentration or divided cell deconcentration.

As many apparently widely different embodiments of the present invention can be made without departing from the spirit and scope thereof, it is to be understood that the invention is not limited to the specific embodiments thereof except as defined in the appended claims.

What is claimed is:

1. A line interface in a switching system for concentrating packet streams from respective ones of a plurality of line interfaces and entering a resulting packet stream into a switch unit, comprising:

a first packet address converter for converting a connection identification included in a header of the packet to a packet address having a number of bits smaller than the number of bits of the connection identification;

a second packet address converter for converting a packet address included in the header of a packet that enters from the switch side, to a connection identification; and a line accommodating unit for converting a frame signal which has entered from a corresponding incoming line and has a prescribed format to a packet stream, entering this packet stream into said first packet address converter, converting a packet stream which has entered from said second packet address converter to a frame signal having the prescribed format and sending this frame signal to a corresponding outgoing line.

2. A line interface in a switching system for concentrating packet streams from respective ones of a plurality of line interfaces, and entering a resulting packet stream into a switch unit, comprising:

a first packet address converter for converting a connection identification included in a header of a packet to a packet address having a number of bits smaller than the number of bits of the connection identification;

a second packet address converter for converting a packet address, which is included in the header of a packet that enters from the switch side, to a connection identification;

a plurality of line accommodating units each for converting a frame signal which has entered from a corresponding incoming line and has a prescribed format to a packet stream, outputting this packet stream toward the side of said first packet address converter, converting a packet stream which has entered from the side of said second packet address converter to a frame signal having the prescribed format and sending this frame signal to a corresponding outgoing line;

a time-division multiplexer for time-division multiplexing packets output by each of said line accommodating units and entering the packets into said first packet address converter; and a demultiplexer for demultiplexing packets, which are output by the second packet address converter, and entering the demultiplexed packets into a prescribed line accommodating unit.

3. A packet concentrator apparatus for concentrating packet streams from respective ones of a plurality of line interfaces and entering a resulting packet stream into a switch unit, comprising:

a plurality of time-division multiplexers for time-division multiplexing packets output by the plurality of line interfaces;

a plurality of packet buffers for storing packets output by respective ones of said time-division multiplexers;

a management unit for managing, in order of storage, a sequence of packet buffers in which packets are stored; and means for reading packets out of the packet buffers in said order of storage and at a prescribed speed, and entering the packets into the switch.

4. A packet deconcentrator apparatus for deconcentrating packets from a switch unit, on a per line interface basis, each line interface accommodating one or a plurality of lines, comprising:

a packet buffer for storing packets that have entered from the switch;

an address managing FIFO, provided in correspondence with each line interface, for storing an address of said packet buffer in which a packet has been stored;

a write controller for storing a packet at a prescribed address of said packet buffer and storing the address data in an address managing FIFO corresponding to a line interface to which the said packet is sent; and a read controller for performing scanning cyclically to determine whether address data has been stored in each address managing FIFO, and, if address data has been stored in a prescribed address managing FIFO, reading a packet from a storage area of said packet buffer designated by the address data and entering the packet into a line interface corresponding to this address managing FIFO.

5. A switching system for concentrating packet streams from respective ones of a plurality of line interfaces and entering a resulting packet stream into a switch unit, and deconcentrating packets from the switch unit, on a per line interface basis, said switching system comprising:

a concentrator for concentrating packets output by each of the line interfaces and entering the packets into the switch unit; and a deconcentrator for deconcentrating packets output by the switch unit and entering the packets into prescribed interface units;, said deconcentrator including:

a packet buffer for storing packets that have entered from the switch unit;

an address managing FIFO, provided in correspondence with an outgoing line, for storing an address of the packet buffer in which a packet has been stored;

a write controller for storing a packet at a prescribed address of said packet buffer and storing the address data in an address managing FIFO corresponding to an outgoing line to which the said packet is sent;

a read controller for performing scanning cyclically to determine whether address data has been stored in each address managing FIFO, and, if address data has been stored in a prescribed address managing FIFO, reading a packet from a storage area of said packet buffer designated by the address data; and a time-division multiplexer for time-division multiplexing packets, a which are sent to each of a plurality of outgoing lines connected to a line interface, and entering the packets into said line interface.

6. A switching system in which frame signals having a prescribed format are made packet streams and output by a plurality of line interfaces, the packet streams output by respective ones of the plurality of line interfaces are concentrated and entered into a switch unit by a concentrator, packets that have been switched by the switch unit are deconcentrated on a per line interface basis by a deconcentrator, and resulting packet streams are made the frame signals and transmitted by the line interfaces, wherein:

each of said line interfaces has data add-on means for adding, onto a packet header, active/standby identification data indicating whether its own line interface is active or standby; and said concentrator has:

means for identifying, based upon the active/standby identification data, whether a packet that has entered from a line interface is an active packet or a standby packet, and discarding a standby packet; and means for concentrating only packets other than standby packets and entering these packets into the switch unit.

7. The system according to claim 6, wherein said deconcentrator includes:

a packet buffer for storing packets that have entered from the switch unit;

an address managing FIFO, provided in correspondence with each line interface, for storing an address of said packet buffer in which a packet has been stored;

a write controller for storing a packet at a prescribed address of said packet buffer and storing the address data in an address managing FIFO corresponding to a line interface to which the said packet is sent; and a read controller for performing scanning cyclically to determine whether address data has been stored in each address managing FIFO, and, if address data has been stored in a prescribed address managing FIFO, reading a packet from a storage area of said packet buffer designated by the address data and entering the packet into a line interface corresponding to this address managing FIFO;

wherein if a line interface has been duplexed, said write controller stores said address data not only in an address managing FIFO corresponding to an active line interface, but also in an address managing FIFO corresponding to a standby line interface.

* * * * *